US009430021B2

(12) United States Patent
Lu et al.

(10) Patent No.: US 9,430,021 B2
(45) Date of Patent: *Aug. 30, 2016

(54) BATTERY MANAGEMENT SYSTEM AND METHOD

(71) Applicant: Advanergy, Inc., Winnetka, CA (US)

(72) Inventors: Jin Lu, Oak Park, CA (US); Todd Scott Kelly, Winnetka, CA (US); Lee Cheung, Thousand Oaks, CA (US)

(73) Assignee: ADVANERGY, INC., Winnetka, CA (US)

( * ) Notice: Subject to any disclaimer, the term of this patent is extended or adjusted under 35 U.S.C. 154(b) by 254 days.

This patent is subject to a terminal disclaimer.

(21) Appl. No.: 14/047,613

(22) Filed: Oct. 7, 2013

(65) Prior Publication Data

US 2014/0101476 A1 Apr. 10, 2014

Related U.S. Application Data

(63) Continuation of application No. 13/644,995, filed on Oct. 4, 2012, now Pat. No. 8,583,955, and a continuation-in-part of application No. PCT/US2012/058771, filed on Oct. 4, 2012.

(51) Int. Cl.
*G06F 1/00* (2006.01)
*G06F 11/30* (2006.01)
(Continued)

(52) U.S. Cl.
CPC ............. *G06F 1/3212* (2013.01); *G05B 13/02* (2013.01); *H04L 12/2807* (2013.01);
(Continued)

(58) Field of Classification Search
CPC .................................. G06F 1/32; G06F 1/26
See application file for complete search history.

(56) References Cited

U.S. PATENT DOCUMENTS 6,463,545 B1 * 10/2002 Fisher .................... G06F 1/263
713/300
2002/0130652 A1 9/2002 Bessler
(Continued)

FOREIGN PATENT DOCUMENTS

KR 1020080095645 A 10/2008
WO 2011087164 A1 7/2011

OTHER PUBLICATIONS (Author Unknown); "Battery Life (and Death)"; Electropaedia; at least as early as Oct. 4, 2011; http://www.mpoweruk.com/life.htm; 8 pp.

(Continued)

*Primary Examiner* — Phil Nguyen
(74) *Attorney, Agent, or Firm* — David W. Carstens; Kevin M. Klughart; Carstens & Cahoon, LLP

(57) ABSTRACT

A battery management system/method implementing optimal dynamic battery charge/discharge cycling is disclosed. The system utilizes a power source control unit (PSCU) to selectively switch a power supply source to a battery charger that charges a battery servicing a portable computing device. The PSCU is controlled by a power monitor control unit (PMCU) that monitors the battery state and determines the optimal charge/discharge profile for the battery. Depending on the type and current condition of the battery as well as battery charge/discharge history, the PMCU monitors the historical, current, and/or anticipated demand activity of the battery to determine an optimal charge/discharge profile for the battery to enable maximum battery life under a wide variety of environmental and use profiles. Present invention methods control battery charge/discharge activity based on computing device historical/anticipated use characteristics, battery chemistry, and/or optimal battery lifecycle operation.

30 Claims, 32 Drawing Sheets

(51) Int. Cl.

| | | |
|---|---|---|
| *G06F 1/32* | (2006.01) | |
| *H04L 12/28* | (2006.01) | |
| *H04L 12/66* | (2006.01) | |
| *G05B 13/02* | (2006.01) | |
| *G06F 1/26* | (2006.01) | |
| *H02J 3/14* | (2006.01) | |

(52) U.S. Cl.
CPC .......... *H04L 12/2836* (2013.01); *H04L 12/66* (2013.01); *G06F 1/26* (2013.01); *G06F 1/32* (2013.01); *H01H 2300/03* (2013.01); *H02J 2003/143* (2013.01); *H04L 12/283* (2013.01); *H04L 12/2816* (2013.01); *H04L 12/2823* (2013.01); *Y02B 70/325* (2013.01); *Y02B 70/3266* (2013.01); *Y02B 90/224* (2013.01); *Y04S 20/14* (2013.01); *Y04S 20/228* (2013.01); *Y04S 20/242* (2013.01)

(56) References Cited

U.S. PATENT DOCUMENTS

| | | |
|---|---|---|
| 2005/0057223 A1 | 3/2005 | Harada |
| 2006/0259184 A1 | 11/2006 | Hayes et al. |
| 2007/0112939 A1 | 5/2007 | Wilson et al. |
| 2008/0255692 A1 | 10/2008 | Hofrichter et al. |
| 2008/0288618 A1 | 11/2008 | Vardi et al. |
| 2009/0147696 A1 | 6/2009 | Park et al. |
| 2009/0224603 A1 | 9/2009 | Perper et al. |
| 2009/0295232 A1* | 12/2009 | McGinley ................ G06F 1/26 307/126 |
| 2010/0019718 A1* | 1/2010 | Salasoo ................ B60L 3/0046 320/103 |
| 2010/0070217 A1 | 3/2010 | Shimada et al. |
| 2010/0138092 A1 | 6/2010 | Kohn |
| 2010/0164284 A1* | 7/2010 | Lee ........................ G06F 1/266 307/38 |
| 2010/0188046 A1 | 7/2010 | Liu et al. |
| 2010/0238003 A1 | 9/2010 | Chan et al. |
| 2010/0305773 A1 | 12/2010 | Cohen |
| 2010/0332164 A1 | 12/2010 | Aisa et al. |
| 2011/0106279 A1 | 5/2011 | Cho et al. |
| 2011/0202293 A1 | 8/2011 | Kobraei et al. |

OTHER PUBLICATIONS (Author Unknown); "Charging Lithium-ion"; Battery University; at least as early as Nov. 10, 2010; http://batteryuniversity.com/index.php/learn/article/charging_lithium_ion_batteries; 32 pp.

(Author Unknown); "Battery Management System (BMS)"; Electropaedia; at least as early as Oct. 4, 2011; http://www.mpoweruk.com/bms.htm#smartbats (smart battery); 8 pp.

(Author Unknown); "How to Prolong Lithium-based Batteries"; Battery University; at least as early as Oct. 21, 2010; http://batteryuniversity.com/learn/article/how_to_prolong_lithium_based_batteries; 34 pp.

Tarandeep Singh; "Secrets for Prolonging Lithium-based Battery Life"; Geeknizer; May 12, 2009; http://geeknizer.com/secrets-for-prolonging-lithium-based-batteries/#ixzz1Zju0wY6H; 4 pp.

(Author Unknown); "How to Enable/Disable Battery Care Function on Sony Vaio to Improve Battery Life"; Digital Pbk (Forum); at least as early as Augst 12, 2011; http://digitalpbk.com/hardware/sony-vaio-enable-battery-care-function-improve-battery-life; 4 pp.

(Author Unknown); "Wi-Fi Light Control"; Wi-Fi Planet (Forum); Jan. 31, 2009; http://forums.wi-fiplanet.com/showthread.php?t=9954; 5 pp.

(Author Unknown); "Why Hasn't Anyone Made Any WiFi Light Switches or Power Sockets?"; Wi-Fi Planet (Forum); Dec. 29, 2005; http://forums.wi-fiplanet.com/showthread.php?t=5584; 4 pp.

(Author Unknown); "Simplest Possible WiFi Remote Power Switch"; AVS (Forum); Sep. 15, 2011; http://www.avsforum.com/avs-vb/showthread.php?p=20977417; 5 pp.

(Author Unknown); "A Wi-Fi Controlled Power Outlet From iPhone?"; Yahoo Answers; Apr. 1, 2011; http://answers.yahoo.com/question/index?qid=20110401143408AAPQerm; 2 pp.

(Author Unknown); "Control Home Lights Via Internet With Your Computer or Wi-Fi Handheld Devices"; Squidoo; at least as early as Apr. 5, 2012; http://www.squidoo.com/control-home-lights-via-internet; 7 pp.

Harmony Gateway—Multi-Protocol HAN Gateway/Controller—Model #5010M; SimpleHomeNet; at least as early as Oct. 3, 2012; http://www.simplehomenet.com/proddetail.asp?prod=HarmonyGateway; 1 p.

* cited by examiner

*Prior Art*

BATTERY MANAGEMENT SYSTEM AND METHOD

CROSS REFERENCE TO RELATED APPLICATIONS

Continuation Patent Application

This application is a continuation of United States patent application for BATTERY MANAGEMENT SYSTEM AND METHOD by Jin (nmn) Lu, Todd Scott Kelly, and Lee (nmn) Cheung, filed electronically with the USPTO on Oct. 4, 2012, with Ser. No. 13/644,995.

This application claims benefit under 35 U.S.C. §120 and incorporates by reference United States patent application for BATTERY MANAGEMENT SYSTEM AND METHOD by Jin (nmn) Lu, Todd Scott Kelly, and Lee (nmn) Cheung, filed electronically with the USPTO on Oct. 4, 2012, with Ser. No. 13/644,995.

Provisional Patent Applications

This application claims benefit under 35 U.S.C. §119 and incorporates by reference United States Provisional Patent Application for DATA SERVER SYSTEM AND METHOD by inventors Jin (nmn) Lu and Todd Scott Kelly, filed electronically with the USPTO on Sep. 7, 2012, with Ser. No. 61/698,288.

This application claims benefit under 35 U.S.C. §119 and incorporates by reference United States Provisional patent application for NETWORK INTEGRATION SYSTEM AND METHOD by inventors Jin (nmn) Lu and Todd Scott Kelly, filed electronically with the USPTO on Jul. 3, 2012, with Ser. No. 61/667,477. This document will be referred to herein as "Document NISM."

This application claims benefit under 35 U.S.C. §119 and incorporates by reference United States Provisional Patent Application for POWER CONTROL SYSTEM AND METHOD by inventors Jin (nmn) Lu, Todd Scott Kelly, and Lee (nmn) Cheung, filed electronically with the USPTO on Jun. 18, 2012, with Ser. No. 61/661,100. This document will be referred to herein as "Document PCSM."

This application claims benefit under 35 U.S.C. §119 and incorporates by reference United States Provisional Patent Application for BATTERY MANAGEMENT SYSTEM AND METHOD by Jin (nmn) Lu, Todd Scott Kelly, and Lee (nmn) Cheung, filed electronically with the USPTO on Jun. 4, 2012, with Ser. No. 61/655,099.

This application claims benefit under 35 U.S.C. §119 and incorporates by reference United States Provisional Patent Application for SMART BATTERY CONTROLLER by inventor Jin (nmn) Lu, filed electronically with the USPTO on Oct. 4, 2011, with Ser. No. 61/542,811.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH or Development

Not Applicable

REFERENCE TO A MICROFICHE APPENDIX

Not Applicable

FIELD OF THE INVENTION

The present invention generally relates to systems and methods for the controlled charging and discharging of batteries. Specifically, the present invention attempts to automate and control the charge/discharge cycles of batteries to optimize battery lifespan under a wide variety of power demand and environmental use conditions.

PRIOR ART AND BACKGROUND OF THE INVENTION

Prior Art Background

Rechargeable batteries (especially lithium ion batteries) are generally considered the future of mobile PC, cell phones, and many other portable consumer devices. Their sales are anticipated to grow exponentially to meet the portable power demands of these products. The active lifespan of rechargeable batteries has a direct impact on the cost to consumers of these products, the energy consumed to recharge these devices, and significantly impacts the environment as these batteries end their life cycle and are discarded. If used properly, a typical battery can last 3-5 years or more. However, a battery can only last half of that time if improperly used. Prolonging the lifespan of rechargeable batteries through new methods and technologies may therefore translate into billions of dollars saved for consumers and a reduction in the environmental impact of these energy storage devices.

Battery Characteristics

It is known that all rechargeable batteries suffer from the following problems:
- Full charges or under charges of batteries shorten the life span (or cycle life) of the batteries. This effect is more serious for multi-cell batteries, which are widely used today.
- Batteries need to be charged and discharged (used) frequently—they are designed to be used.
- High temperature reduces the life span of the batteries.
- A battery calibration is needed every 2-3 months to keep the battery level monitoring system accurate.
- For some battery types, a recondition cycle is required every 2-3 months to remove the so called "memory effect" (batteries "remember" how much discharge was required on previous discharges and would only accept that amount of charge in subsequent charges).

As a result of these shortcomings, a rechargeable battery can become unusable well before the designed life span (typically half the designed life span of 5 years) due to improper charging and discharging. This means users must spend more to buy the rechargeable batteries. Additionally, when a battery ages fast due to charging and discharging improperly, significant energy is wasted. Here are a few reasons why energy is wasted when aging batteries are used:

When a battery starts to age, its internal resistance increases to up to 200% of its original value. This implies more energy is turning into heat either when the battery is used (discharged) or when it is charged.

When the battery ages, self-discharge increases (to 10-20%), meaning energy is "dissipated" for no useful purposes.

When fully charged, the battery chemical reaction increases and internal resistance increases even more, turning energy into wasted heat.

As the battery ages, the internal capacity decreases (no longer holds enough energy), and the energy used to charge the battery is turned into reduced stored energy, another form of wasted energy.

When the energy becomes heat, which increases the chemical reactions inside the battery, the situations mentioned above become even worse.

For example, a High Capacity Lithium Battery (HP Laptop Battery H12h) has a rated capacity of 10.8 Volt with 8800 mAh=8.8 Ah. This means that if the PC application draws 1A, it will last 8.8 hours. A typical battery has 300 m ohm to 1 ohm internal resistance. Considering the wasted energy resulting from internal resistance and aging, when the internal resistance increases to 2 ohm, the power wasted on the internal resistance is about 2 W. If more current is drawn, the wasted energy is even more. As an example, considering a self-discharging rate of 10% this equates to another 2 W (10.8V×2 A/10). Charging the battery will require about 11 W (10.8V×1 A). If the charging does not produce expected battery capacity due to aging, then the charging energy is wasted. Assuming that half of the charging energy is wasted, it is not producing the expected energy charge for the battery. Without considering all the energy wasting factors, the wasted energy in this case for an aging battery is 4 W during discharge and 5 W during charging. In reality, the wasted energy is actually higher. Considering the number of hours people use battery-driven devices and the number of such devices, the overall energy waste associated with battery charging factored in a global scale is quite large.

To address the issues, many discussions can be found within the prior art about how to prolong the life of rechargeable batteries. Consumers can extend the lifespan of their rechargeable batteries by following some of the best practices, manually controlling the timing of charring/discharging the batteries, calibrate the battery monitoring system, reconditioning the battery from time to time, etc. However, all of these techniques require a disciplined, consistent practice over a long time. This is a tedious if not impossible job for most users of computing devices.

Many computing devices have energy management software that provides the energy usage monitoring, screen saver and energy saving modes, and shutdown when battery voltage reaches a low level. This practice may help reduce consumed energy, but does not increase the lifespan of the battery.

Most devices have a fixed charge and recharge level, and are not designed for prolonging the battery life, and do not adapt to the user use profile. Some laptops, for example, allow users to specify the charge limits, but they do not address the need of using the battery often. As a result, a battery is charged to a reasonable level, but then kept under trickle charge (constantly being charged and discharged) while the main power is used. In addition, devices have no way to automatically schedule and carry out the calibrations and the recondition cycles that are needed by all battery types and their associated chargers.

Prior Art System Overview (0100)

Within the prior art of battery management as applied to portable computers, as generally illustrated in FIG. 1 (0100), the prior art generally teaches that a portable computing device (or other portable battery-powered device) (0110) typically comprises the computing device (0101) running software read from a computer readable medium (0102), a battery (0103), battery charger (0104), and wall transformer (0105) having an AC plug (0106) for connection to a power source (0107). Within this context the computing device (0101) running under software control (0102) may incorporate a graphical user interface (GUI) (0108) to support operator (0109) interaction.

This configuration may integrate the wall outlet power adapter (0105) and AC power connection (0106) in a single "wall transformer" module and typically integrates the battery (0103) and battery charger (0104) electronics within the computing device enclosure (0110). However, some configurations place the battery charging circuitry (0104) within the wall outlet power adapter (0105) housing and simply supply charging current to the battery (0103) contained within the computing device enclosure (0110). Software (0102) operating on the computing device hardware (0101) may modulate the computing device performance based on detected battery capacity, charge level, and other operator (0109) defined parameters.

Prior Art Method Overview (0200)

As generally seen in the flowchart of FIG. 2 (0200), prior art methods associated with battery charging methodologies may be generally described in terms of the following steps:
(1) Measuring the battery voltage (0201);
(2) Determining if the battery voltage is less than nominal, and if so, proceeding to step (4) (0202);
(3) Initiating a trickle charge or "top off charging" of the battery and proceeding to step (1) (0203);
(4) Enabling a rapid battery charge (0204); and
(5) If the battery charge cycle is complete, proceeding to step (1), otherwise proceeding to step (5) (0205).
This prior art method generally relies on the current battery voltage when determining what charging actions to take with respect to the battery. This method lacks integration of historical battery information in the battery charge cycle.

Deficiencies in the Prior Art

The prior art as detailed above suffers from the following deficiencies:
Prior art battery charging systems/methods have as their goal the "full charging" of the battery in portable computer equipment, even though this goal results in reduced overall battery life.
Prior art battery charging systems/methods generally do not compensate for environmental battery conditions.
Prior art battery charging systems/methods generally do not regulate battery charge/discharge cycles independently.
Prior art battery charging systems/methods generally do not automatically compensate for use characteristics of the portable computer equipment.

Prior art battery charging systems/methods cannot be updated to accommodate a variety of battery types and chemistries.

Prior art battery charging systems/methods do not perform battery calibration tests to dynamically determine the best charge/discharge profiles for the current state of the battery.

Prior art battery charging systems/methods do not permit automatic battery lifecycle optimization to be retrofit into existing battery powered computing devices.

While some of the prior art may teach some solutions to several of these problems, the core issue of optimizing battery lifespan within a wide variety of portable battery powered computer equipment has not been addressed by the prior art.

OBJECTIVES OF THE INVENTION

Accordingly, the objectives of the present invention are (among others) to circumvent the deficiencies in the prior art and affect the following objectives:

(1) Provide for a battery management system and method that permits battery life in portable computing devices to be increased as compared to the prior art charging systems.

(2) Provide for a battery management system and method that permits enhanced battery lifespans to be achieved without modification of the portable computing device hardware.

(3) Provide for a battery management system and method that permits optimization of battery life based on the historical energy demand cycles of a portable computing device.

(4) Provide for a battery management system and method that permits anticipation of battery demand and subsequent modification of battery charging cycles.

(5) Provide for a battery management system and method that permits charge/discharge cycles to be adapted to battery chemistry.

(6) Provide for a battery management system and method that permits wireless control of battery charging/discharge cycles.

(7) Provide for a battery management system and method that permits integration of battery management functions as an application within portable computer equipment.

(8) Provide for a battery management system and method that permits battery charging and calibration cycles to be performed automatically and without user intervention to optimize battery lifespan.

(9) Provide for a battery management system and method that permits battery charge/discharge cycles to be optimized in terms of environmental conditions.

(10) Provide for a battery management system and method that decreases battery material waste by improving battery lifespan within portable computing devices.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview

The present invention in various embodiments addresses one or more of the above objectives in the following manner. The present invention automates battery discharging and charging in terms of reducing battery stress and prolonging battery life. The system/method utilizes a control system to automate the best practices for prolonging the battery life. The present invention automates the best practices for maximizing rechargeable battery life. It does so through automatic control of charge/discharge cycles, battery calibrations, battery reconditioning, as well as other battery lifespan enhancing techniques. The automatic charge/discharge control is accomplished through the monitoring of the battery usage and setting optimal charging/discharging levels of the battery based on factors such as user profiles and the type of batteries. Implementation of this technology permits consumers to prolong the life of their rechargeable batteries by an average of 50-100%, saving expenses on new battery purchase and energy consumed, as well as eliminating the inconvenience of buying and replacing new batteries and disposing of the old batteries.

Method Overview

The present invention system may be utilized in the context of an overall battery management method, wherein the battery management system described previously is controlled by a method having the following steps:

(1) Determining if the Power Source Control Unit (PSCU) is available, and if so, proceeding to step (3);

(2) Issuing a warning message requesting a status of the PSCU and proceeding to step (1);

(3) Determining if battery charging user input parameters are available, and if not, proceeding to step (7);

(4) Configuring user battery charge/discharge parameters;

(5) Configuring user battery calibration parameters;

(6) Configuring user battery recondition parameters then proceeding to step (1);

(7) Executing a battery charge/discharge process;

(8) Executing a battery calibration process; and (9) Executing a battery reconditioning process then proceeding to step (1).

Integration of this and other preferred exemplary embodiment methods in conjunction with a variety of preferred exemplary embodiment systems described herein is anticipated by the overall scope of the present invention.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
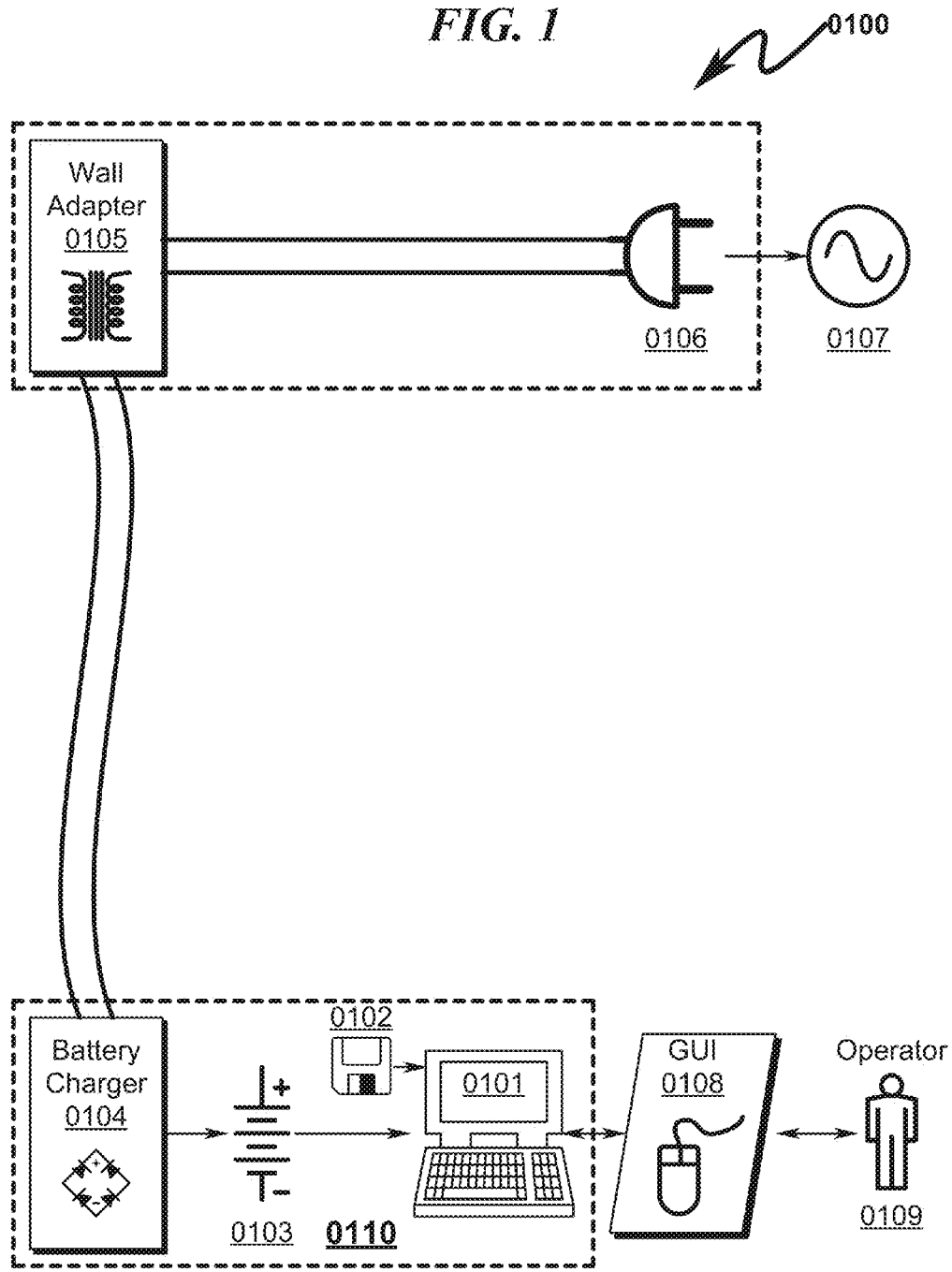
FIG. 1 illustrates a system diagram describing a prior art system context for battery powered computing devices.
Figure 2:
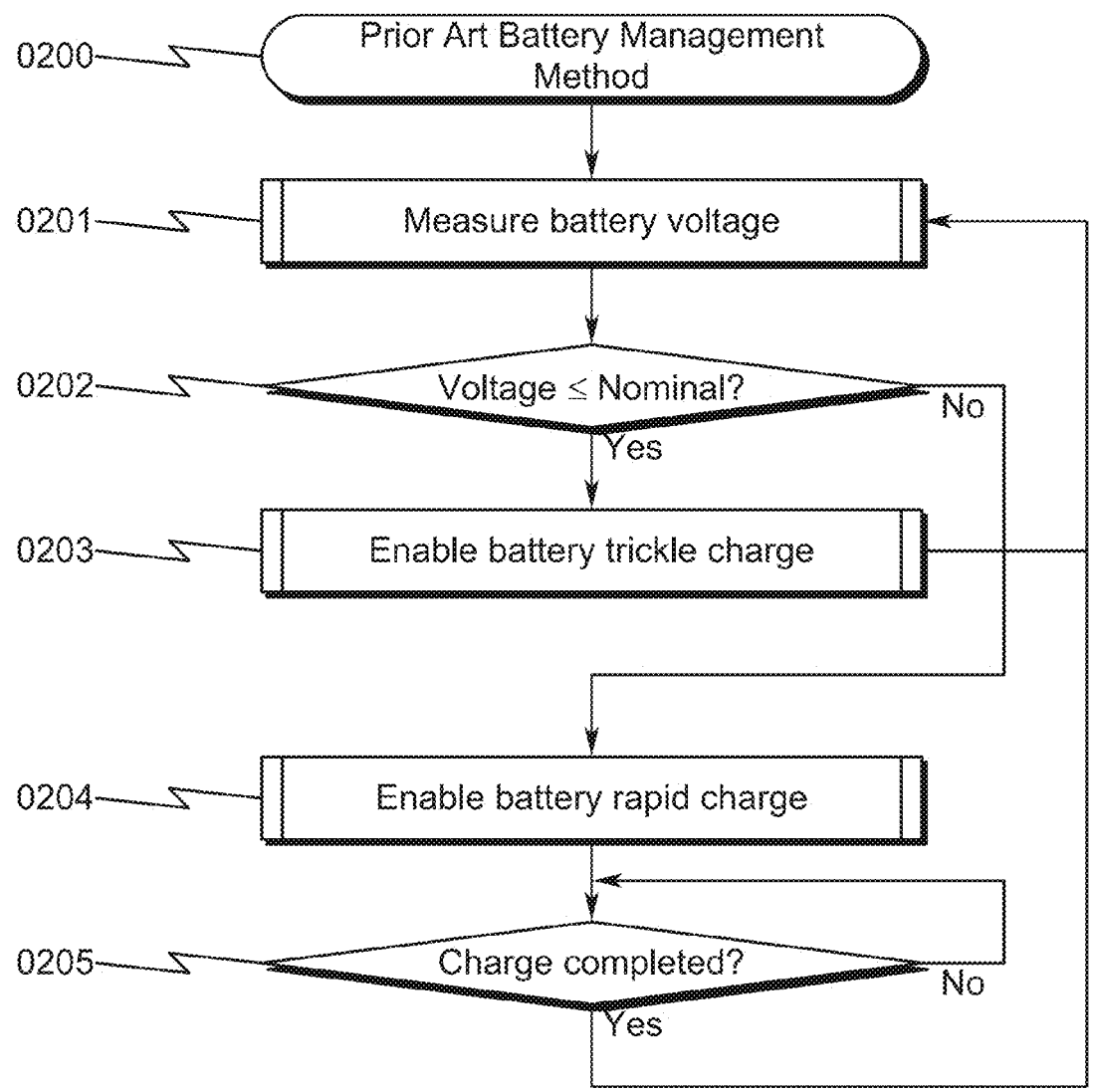
FIG. 2 illustrates a method flowchart describing how prior art systems approach battery charging for battery powered computing devices.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a BATTERY MANAGEMENT SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Timer Charging/Discharging Not Limitive

The present invention anticipates that some preferred embodiments may use a timer to determine charge and discharge cycles for the battery, but this method of charge/discharge cycling is not necessarily the only charge/discharge method.

Portable Computing Device not Limitive

The present invention anticipates a wide variety of applications for the battery management system/method taught herein. Within the application context, the term "portable battery powered computing device" and its variants should be given its broadest possible interpretation, to include but not be limited to laptop computers, cellphones, tablet computers, and other like and typical applications where batteries are used to power equipment in a portable or semi-portable manner. While the present invention anticipates that the computational capability of the "computing device" described herein may vary widely, it is anticipated that some aspects of the present invention may be implemented using software embodied in computer readable program code means embodied on a tangible medium that is computer readable.

Battery not Limitive

The present invention anticipates a wide variety of batteries and battery chemistries may be managed by the battery management described herein. Within this context, many preferred system embodiments will utilize lithium-ion batteries. However, the present invention makes no limitation on the specific type of battery and/or battery chemistry that may be adapted using the present invention teachings.

Invention Nomenclature

The following nomenclature is generally utilized to describe the invention herein:

Computing Device or Host Computing Device—The device where the rechargeable battery is used.

Rechargeable Battery—A battery that can be recharged and used many times over. It is otherwise known as a storage battery because it is able to accumulate and store energy.

Lithium Ion—A popular type of rechargeable battery.

Battery Cycle Life—the number of complete charge/discharge cycles a battery can perform before its nominal capacity falls below 80% of its initial rated capacity.

Battery Calendar Life—the elapsed time before a battery becomes unusable whether it is in active use or inactive.

Automatic Control—Control in which regulating and switching operations are performed automatically in response to predetermined conditions.

Battery Calibration—A process to learn the capacity of a rechargeable battery by the energy management/monitoring system. It is usually done by fully discharging the battery and then fully recharging it.

Battery Recondition—A process to regain the full capacity of some types of batteries. It is usually done by discharging and recharging the battery in certain patterns.

Invention Architecture

The present invention incorporates a control system that automates the best practices in prolonging the lifespan of rechargeable batteries. This control system is termed a "Smart Battery Controller". To address the battery life "shortening" effects listed previously, the Smart Battery Controller monitors power usage, keeps track of consumer use profiles, and provides the following features:

Has knowledge of the optimal battery charge level and discharge level based on the type and age of the battery, and charges and discharges automatically and frequently to these optimal or operator-set levels.

Automatically calibrate PC power management systems, so that the PC energy monitoring is always accurate.

For certain types of batteries, reconditions the batteries from time to time.

Provide an easy-to-use user interface for operators to set the charge and recharge limits and schedule calibrations and reconditions.

Monitors the temperature and halts the charge cycle during periods of high ambient temperature.

Provides a "warning" operator message when the charger power plug should be inserted into the power outlet.

One skilled in the art will recognize that these features may or may not be implemented in each invention embodiment and serve only to describe characteristics of some preferred embodiments.

System Overview (0300)

Figure 3:
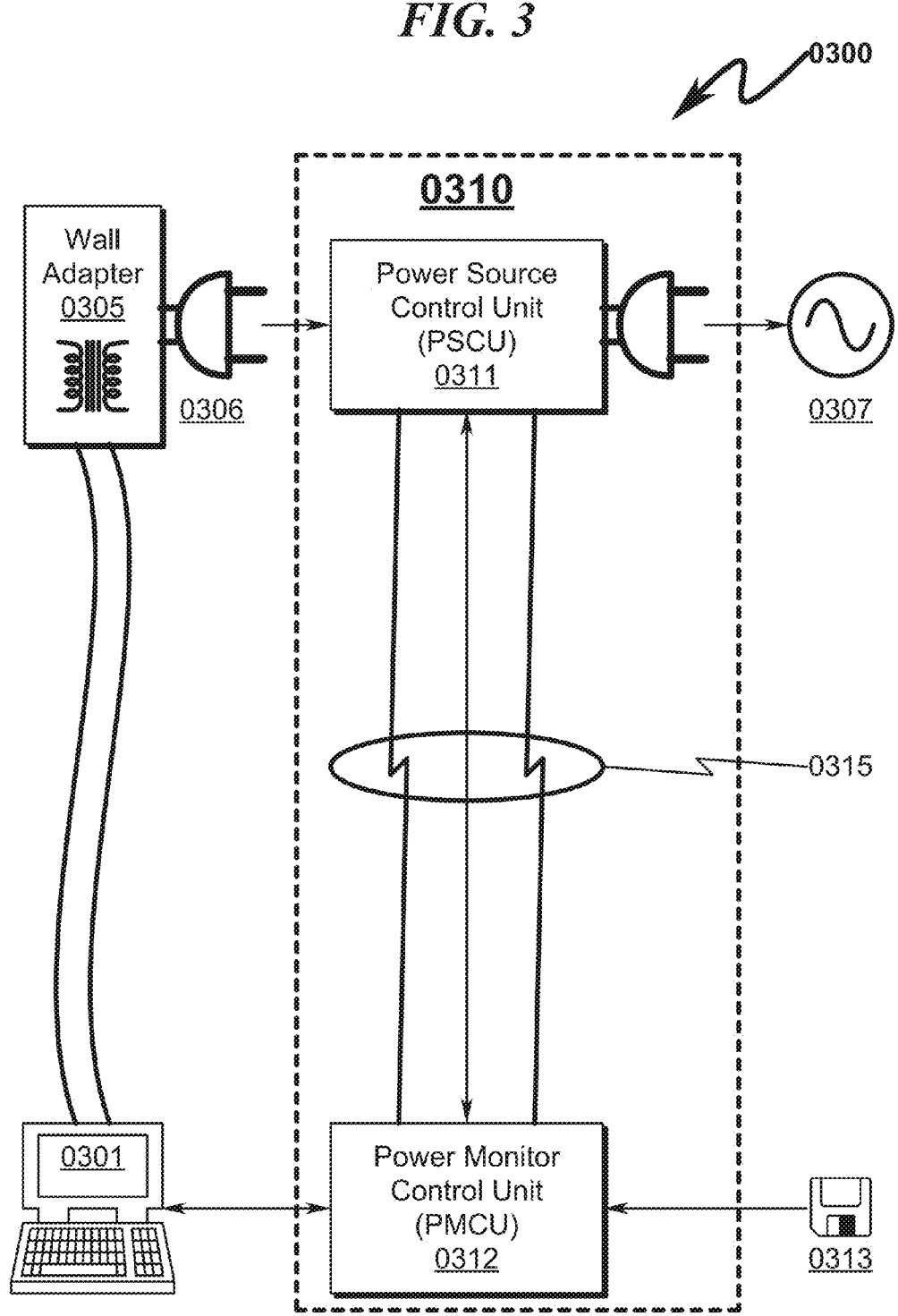
FIG. 3 illustrates a system block overview diagram describing a presently preferred embodiment of the present invention.

The present invention may be seen in an overview context as generally illustrated in FIG. 3 (0300), wherein a computing device (0301) may operate in conjunction with a conventional wall plug power adapter (0305) to provide charging current for the battery/batteries contained within the computing device (0301). The present invention (0310) comprises the Power Source Control Unit (PSCU) (0311) and Power Monitor Control Unit (0312) that operate in conjunction (via communication link (0315)) to switch power to the wall power adapter (0305) from the power source (0307).

Preferred Exemplary Method Embodiment (0400)

Figure 4:
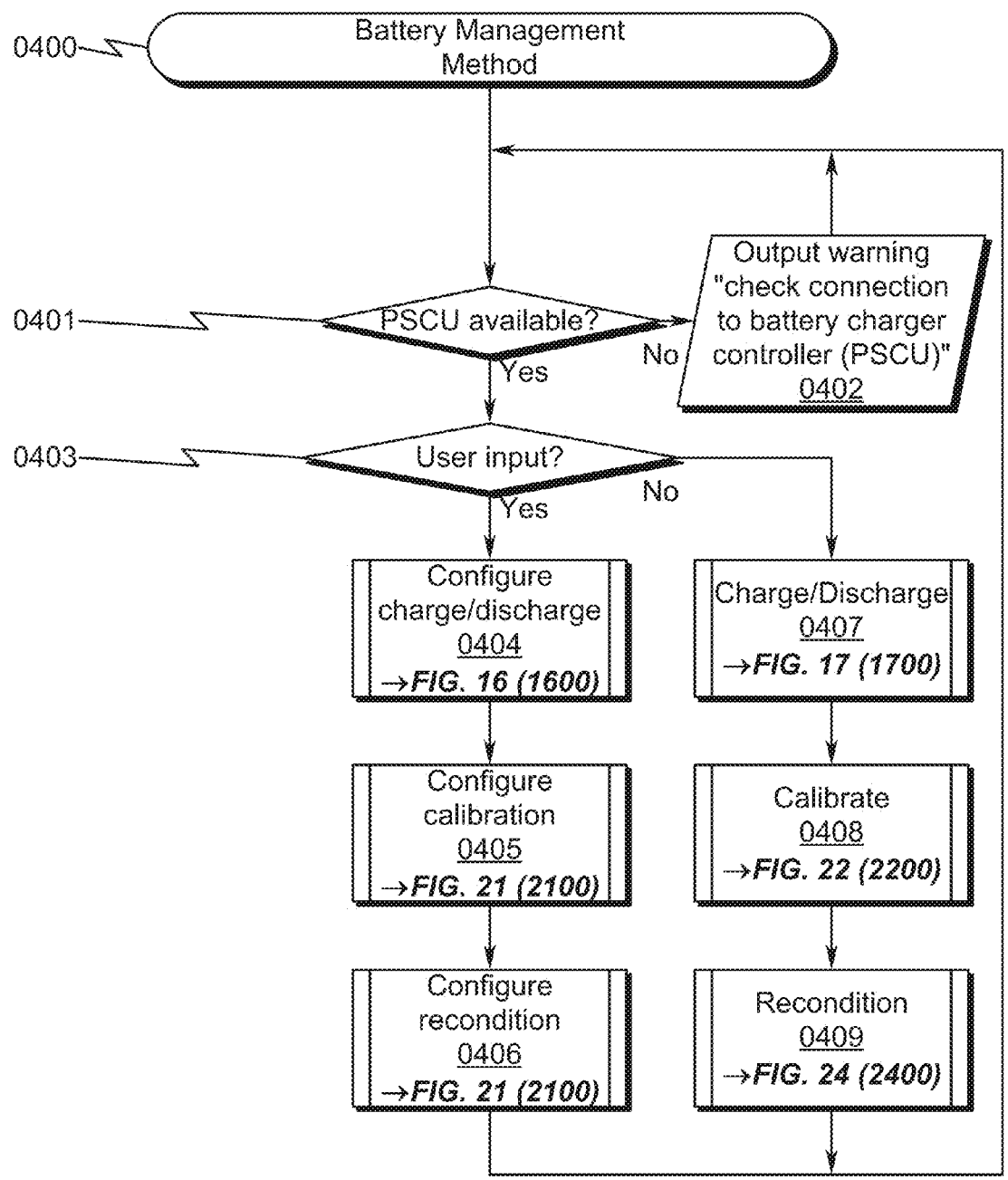
FIG. 4 illustrates a exemplary overview flowchart describing a presently preferred method embodiment of the present invention.

As generally seen in the flowchart of FIG. 4 (0400), the present invention method may be generally described in terms of the following steps:

(1) Determining if the PSCU is available, and if so, proceeding to step (3) (0401);
(2) Issuing a warning message requesting a status of the PSCU and proceeding to step (1) (0402);
(3) Determining if battery charging user input parameters are available, and if not, proceeding to step (7) (0403);
(4) Configuring user battery charge/discharge parameters (0404);
(5) Configuring user battery calibration parameters (0405);
(6) Configuring user battery recondition parameters then proceeding to step (1) (0406);
(7) Executing a battery charge/discharge process (0407);
(8) Executing a battery calibration process (0408); and
(9) Executing a battery reconditioning process then proceeding to step (1) (0409).

One skilled in the art will recognize that these method steps may be augmented or rearranged without limiting the teachings of the present invention. This general method summary may be augmented by the various elements described herein to produce a wide variety of invention embodiments consistent with this overall design description.

Preferred Embodiment System Block Diagram (0500)

Figure 5:
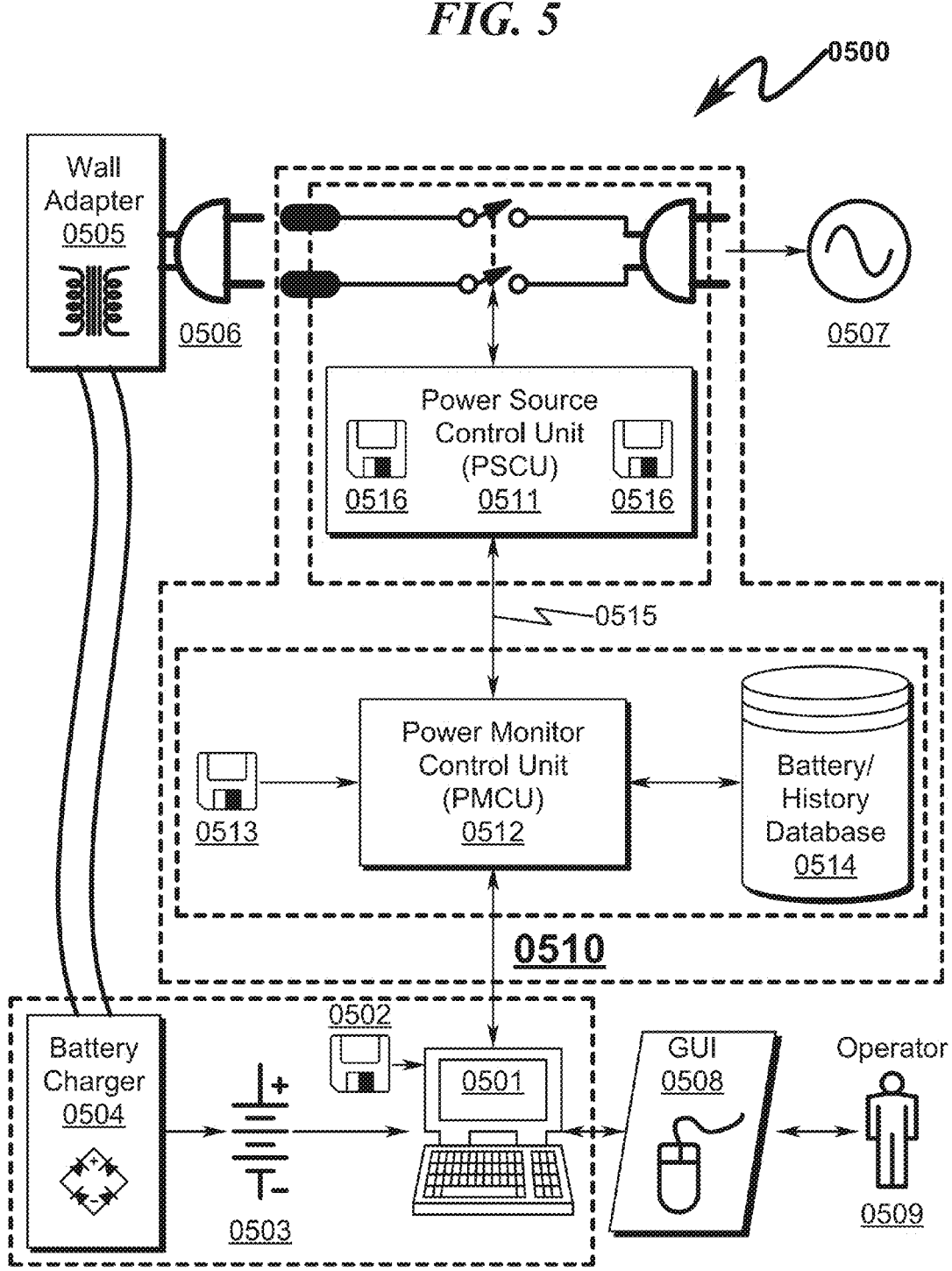
FIG. 5 illustrates a system block diagram describing a presently preferred embodiment of the present invention.

The present invention may be seen in more detail as generally illustrated in FIG. 5 (0500), wherein a computing device (0501) running software read from a computer-readable medium (0502) is supplied by power from an internal battery (0503) that is charged by a battery charger (0504) that is typically located within the housing of the computing device (0501). The battery charger (0504) may operate in conjunction with a conventional wall plug power adapter (0505) to provide charging current for the battery/batteries (0503) contained within the computing device (0501). The present invention (0510) comprises the Power Source Control Unit (PSCU) (0511) and Power Monitor Control Unit (PMCU) (0512) that operate in conjunction (via communication link (0515)) to switch power to the wall power adapter (0505) from the power source (0507). Within this context the PSCU (0511) and PMCU (0512) may incorporate software retrieved from a computer readable medium (0513, 0516). Additionally, the PMCU (0512) may incorporate battery and/or historical use data retrieved from a database (0514) for use in determining optimal charge/discharge profiles for the battery (0503).

Alternate Preferred Embodiment System Block Diagram (0600)

Figure 6:
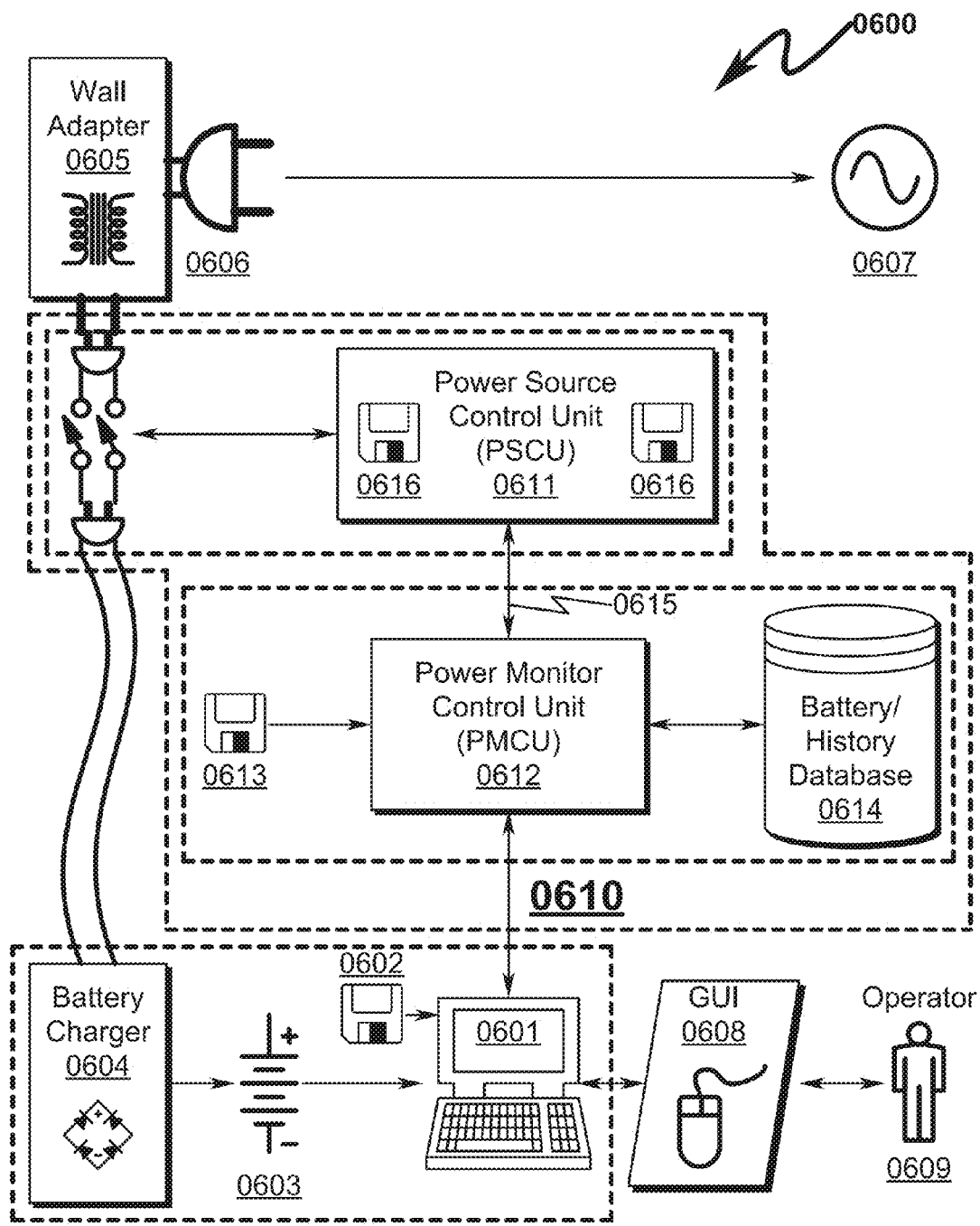
FIG. 6 illustrates a system block diagram describing a presently preferred alternate embodiment of the present invention.

The present invention may be alternately embodied and modified as generally illustrated in FIG. 6 (0600), wherein a computing device (0601) running software read from a computer-readable medium (0602) is supplied by power from an internal battery (0603) that is charged by a battery charger (0604) that is typically within the housing of the computing device (0601). The battery charger (0604) may operate in conjunction with a conventional wall plug power adapter (0605) to provide charging current for the battery/batteries (0603) contained within the computing device (0601). The present invention (0610) comprises the Power Source Control Unit (PSCU) (0611) and Power Monitor Control Unit (PMCU) (0612) that operate in conjunction (via communication link (0615)) to switch power from the wall power adapter (0605) to the battery charger (0604). Within this context the PSCU (0611) and PMCU (0612) may incorporate software retrieved from a computer readable medium (0613, 0616). Additionally, the PMCU (0612) may incorporate battery and/or historical use data retrieved from a database (0514) for use in determining optimal charge/discharge profiles for the battery (0603).

Preferred Embodiment System Architecture (0700)

Figure 7:
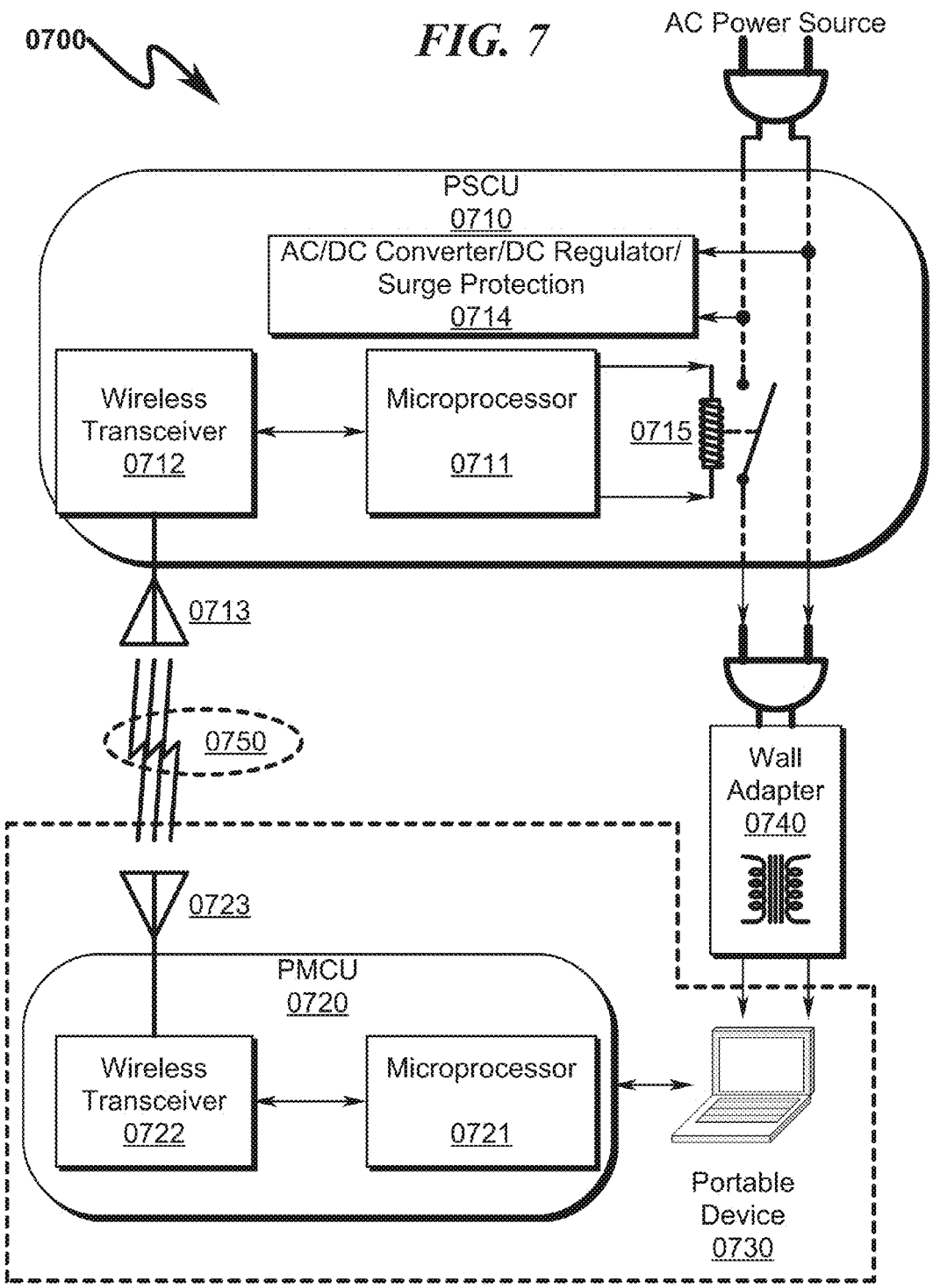
FIG. 7 illustrates an exemplary system block diagram of a preferred exemplary system embodiment of the present invention.

A preferred exemplary embodiment of the present invention showing interaction between the PSCU and the PMCU may be seen in more detail as generally illustrated in FIG. 7 (0700), wherein the PSCU (0710) and PMCU (0720) act in concert to support the battery management requirements of a portable device (0730) serviced by a wall power supply adapter (0740). Within this preferred context the PSCU (0710) incorporates microprocessor control (0711) in conjunction with a wireless transceiver (0712) and associated antenna (0713). Power to support these internal subsystems is obtained from an AC/DC converter/DC regulator/surge protection module (0714). This preferred configuration switches power from the AC power source using a relay (0715) or other switching means. This power switching (0715) results in enablement/disablement of power to the wall power adapter (0740) that supports charging of the battery in the portable device (0730).

Modulation of the power switch (0715) state is accomplished by wireless communication (0750) with the PMCU (0720) that has an internal microprocessor (0721), wireless transceiver (0722), and associated antenna (0723). The PMCU (0720) microprocessor (0721) is generally in communication with (or embedded as software within) the portable device (0730) for which battery management functionality is to be affected. Additionally, the PMCU (0720) wireless transceiver (0722) and associated antenna (0723) may be integrated within the context of the portable device (0730).

Alternate Preferred Embodiment System Architecture (0800)

Figure 8:
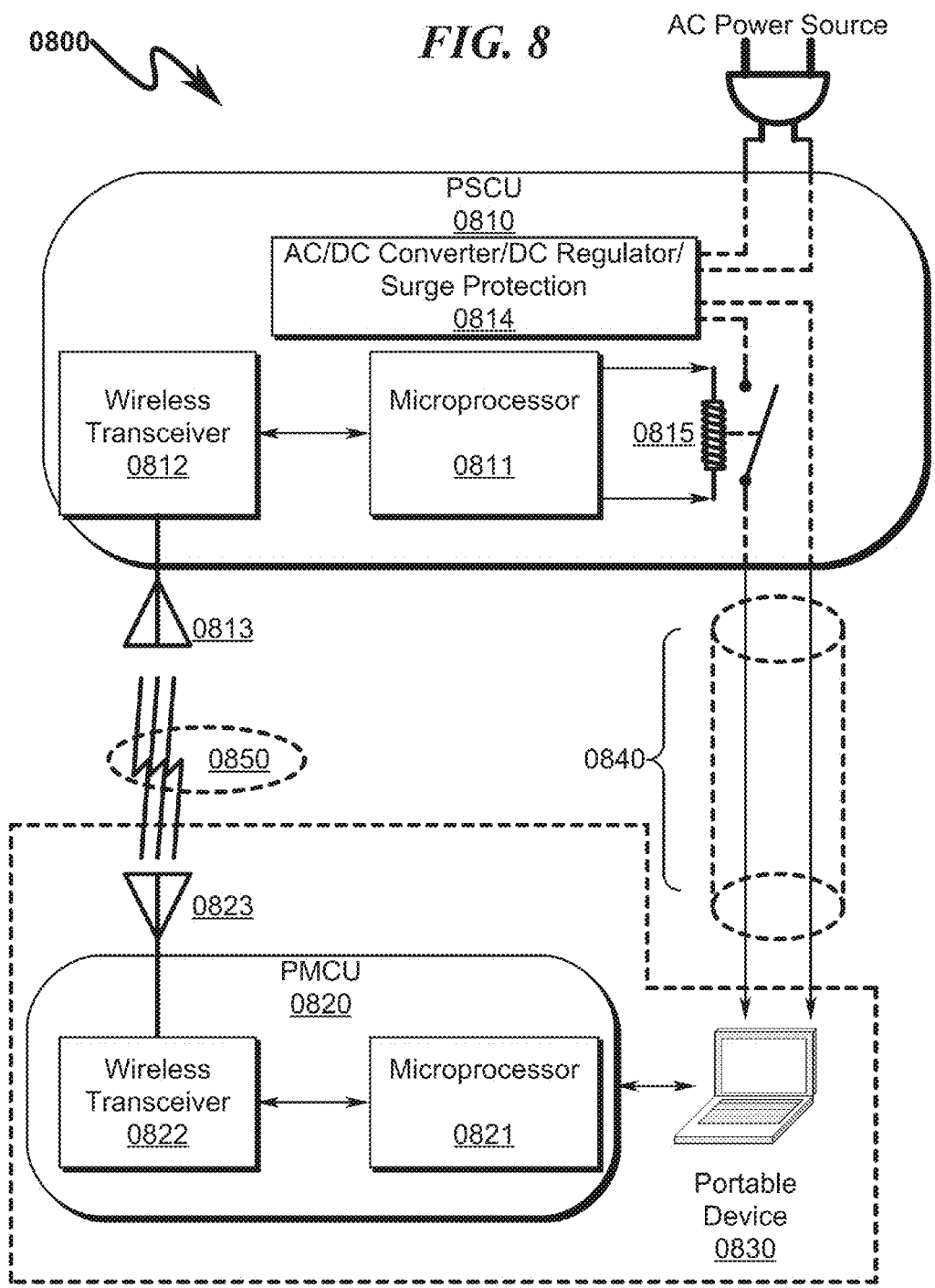
FIG. 8 illustrates an exemplary schematic block diagram of an alternate preferred exemplary system embodiment of the present invention.

An alternate preferred exemplary embodiment of the present invention showing interaction between the PSCU and the PMCU may be seen in more detail as generally illustrated in FIG. 8 (0800), wherein the PSCU (0810) and PMCU (0820) act in concert to support the battery management requirements of a portable device (0830) connected to the PSCU (0710) by a power cord (0840). This alternate preferred embodiment integrates the functionality of the PSCU (0710) and the wall power transformer power supply (0740) as illustrated in FIG. 7 (0700). Within this alternate preferred context the PSCU (0810) incorporates microprocessor control (0811) in conjunction with a wireless transceiver (0812) and associated antenna (0813). Power to support these internal subsystems (and the portable device (0830)) is obtained from an AC/DC converter/DC regulator/surge protection module (0814). This preferred configuration switches power from the internal DC power supply source (0814) using a relay (0815) or other switching means. This power switching (0815) results in enablement/disablement of DC power to the portable device (0830).

Modulation of the power switch (0815) state is accomplished by wireless communication (0850) with the PMCU (0820) that has an internal microprocessor (0821), wireless transceiver (0822), and associated antenna (0823). The PMCU (0820) microprocessor (0821) is generally in communication with (or embedded as software within) the portable device (0830) for which battery management functionality is to be affected. Additionally, the PMCU (0820) wireless transceiver (0822) and associated antenna (0823) may be integrated within the context of the portable device (0830).

Preferred Exemplary PSCU Block Diagram (0900)-(1400)

Figure 9:
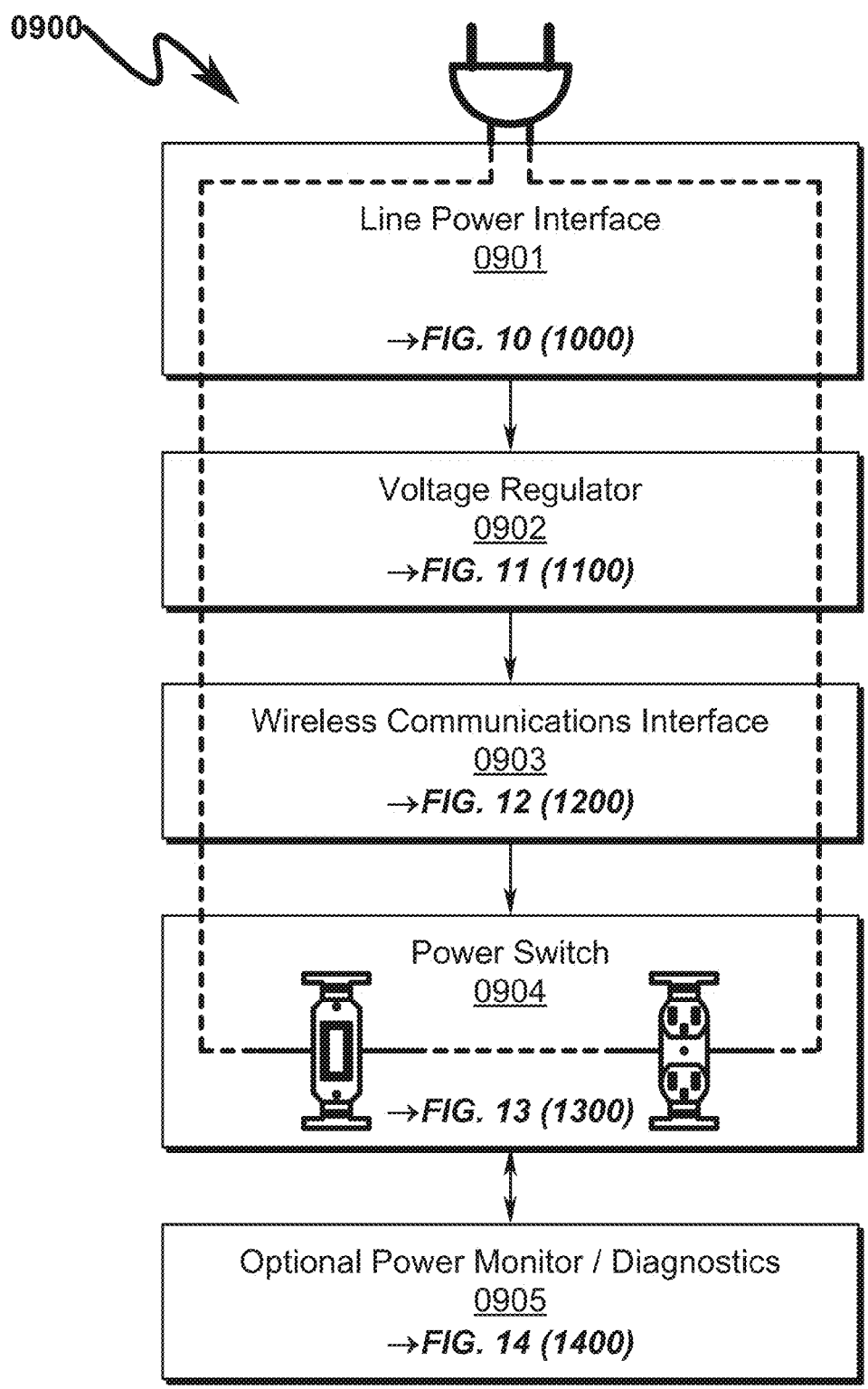
FIG. 9 illustrates an exemplary schematic block diagram of a preferred exemplary PSCU embodiment.
Figure 10:
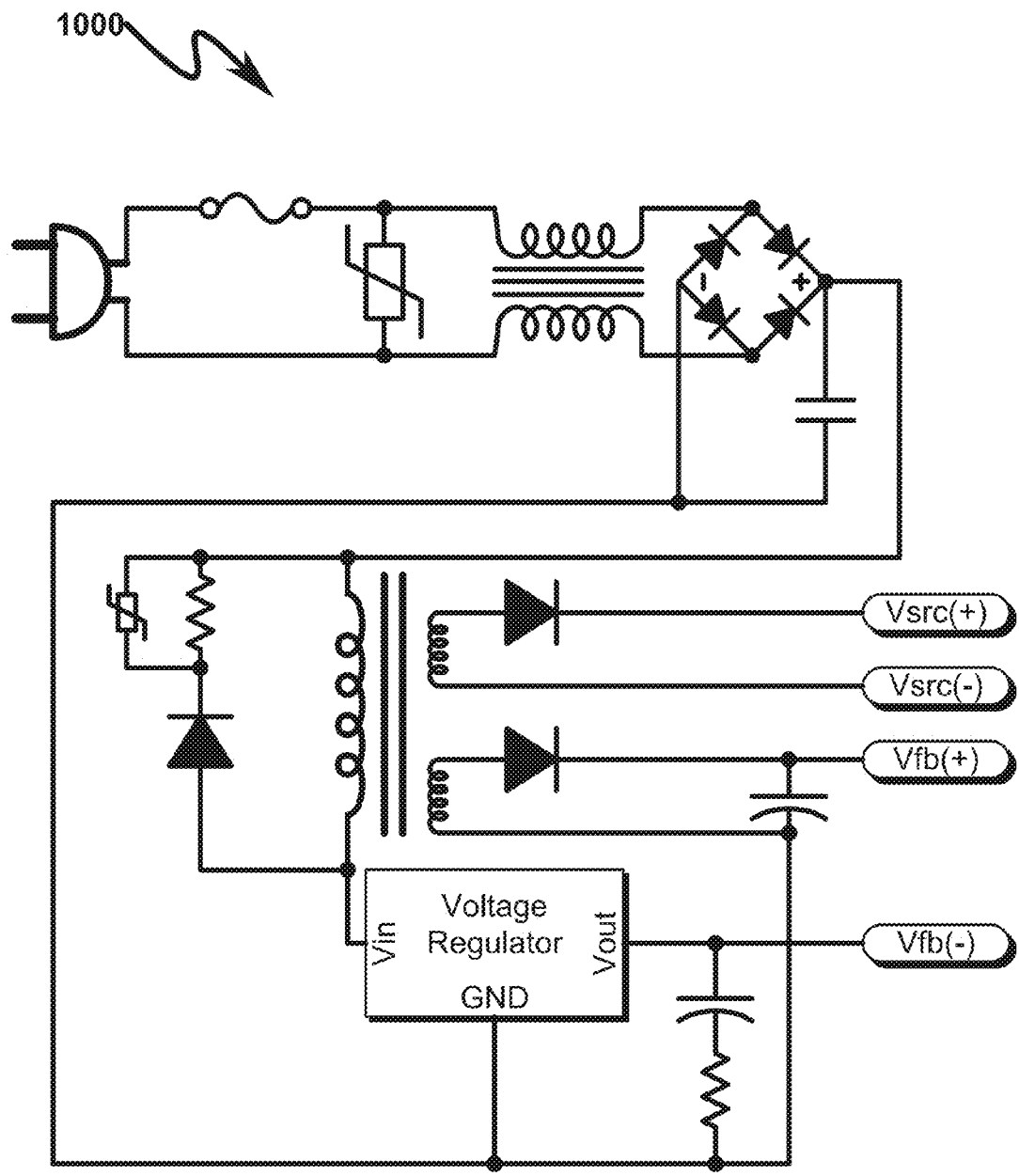
FIG. 10 illustrates an exemplary schematic of a preferred exemplary PSCU Line Power Interface embodiment.
Figure 14:
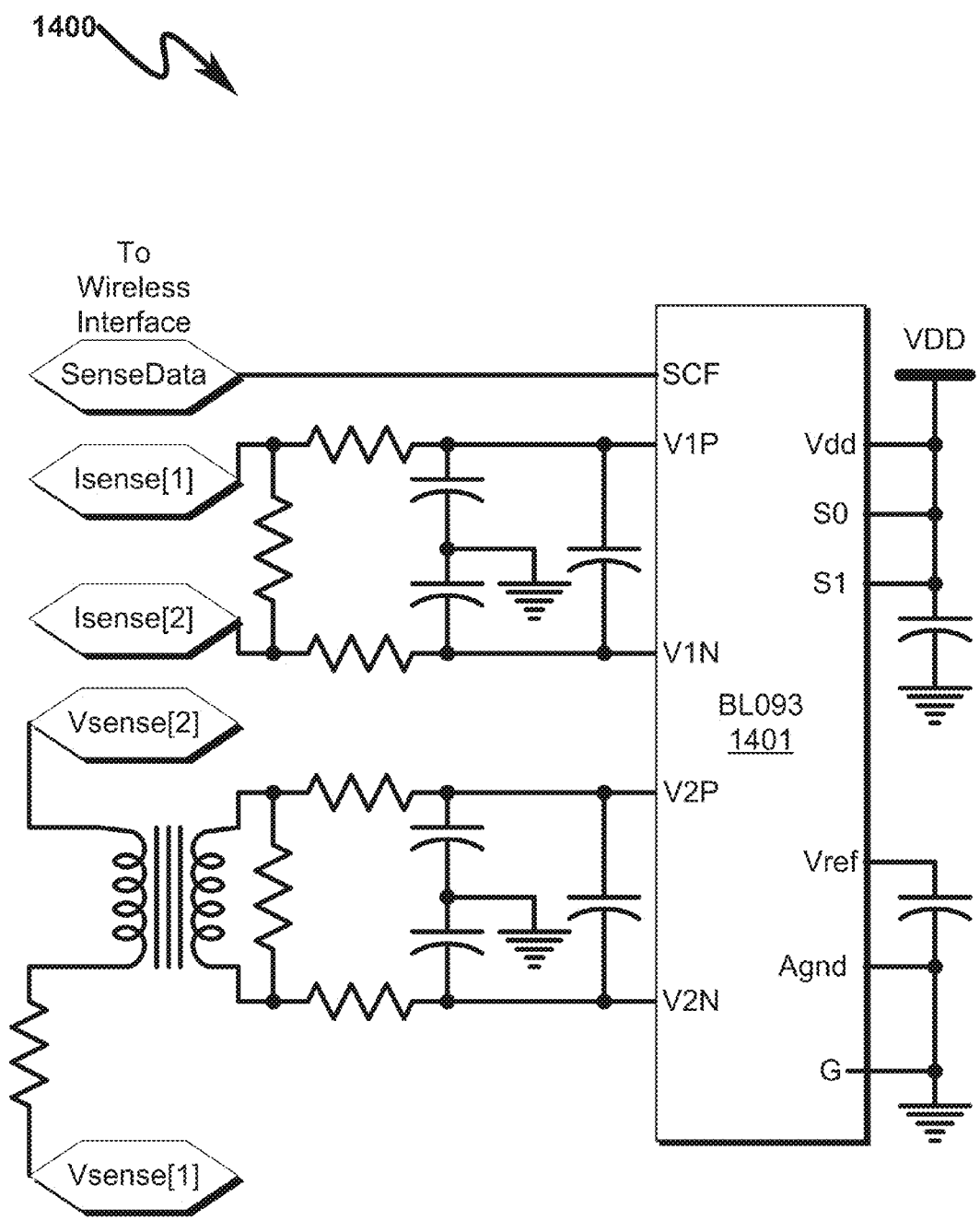
FIG. 14 illustrates an exemplary schematic of a preferred exemplary PSCU Optional Power Monitor/Diagnostics embodiment.

A preferred exemplary system electrical block diagram of a typical PSCU system is generally illustrated in FIG. 9 (0900), with exemplary detail of the block illustrated in FIG. 9 (0900) depicted in FIG. 10 (1000)-FIG. 14 (1400). This preferred embodiment comprises the following circuits:

Line Power Interface (0901)—As detailed in FIG. 10 (1000), the input outlet brings 110V AC in through the fuse and split into two paths. The first path converts the AC voltage to a DC voltage by 4-diode bridge rectifier. A transformer steps down the voltage to the level for further regulation. DC regulator (U3) provides +5 VDC supply for the remaining circuits of the unit. The second path brings 110V AC voltage forward to the output socket via a power relay in the power switch (0904) by the output voltage is controlled as detailed in FIG. 13 (1300).

Figure 11:
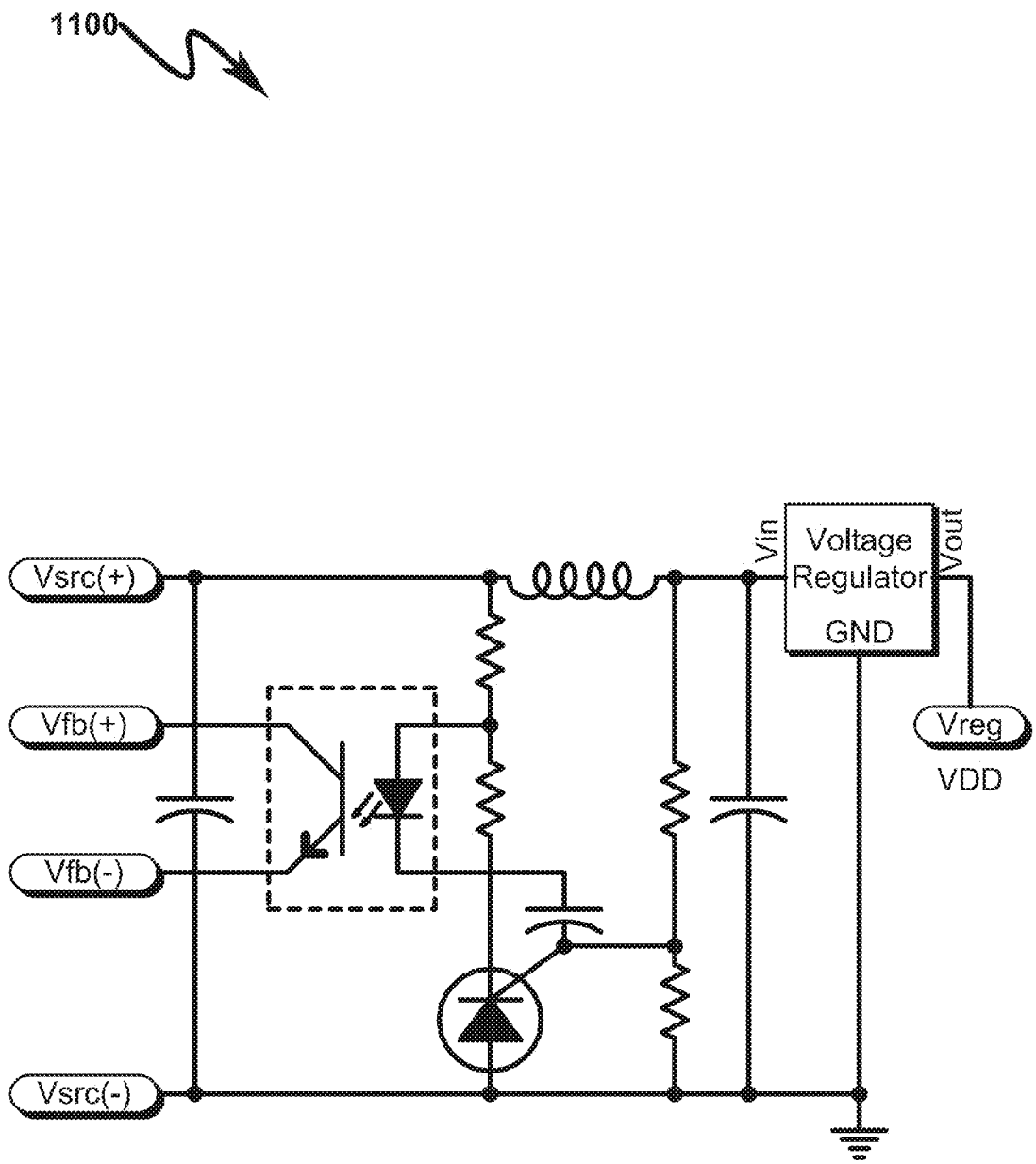
FIG. 11 illustrates an exemplary schematic of a preferred exemplary PSCU Voltage Regulator embodiment.

Voltage Regulator (0902)—As detailed in FIG. 11 (1100), the DC Regulator brings +5 VDC from the line power interface (0901) further down to +3.3 VDC for supplying a wireless transceiver in the wireless communications interface (0903).

Figure 12:
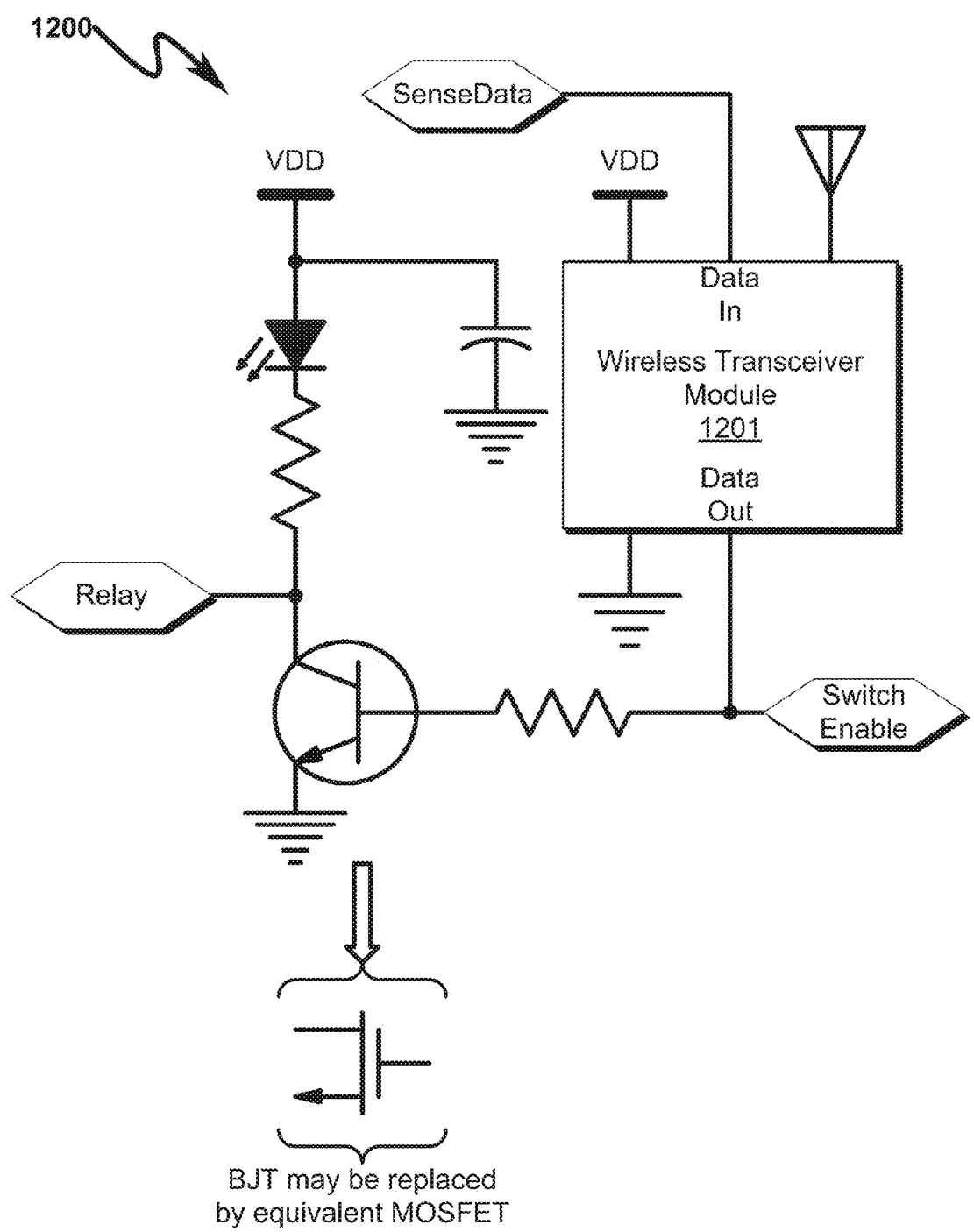
FIG. 12 illustrates an exemplary schematic of a preferred exemplary PSCU Wireless Communication Interface embodiment.

Wireless Communications Interface (0903). As detailed in FIG. 12 (1200), a wireless transceiver (1201) receives the commands from the computer or/and other WiFi or wireless device. The received command via the wireless receiver interface (1201) provides a logic signal (SWITCH) to turn on/off the transistor switch (Q1). Q1 controls the on/off position of the power relay in the power switch circuitry (0904) based on commands from the PMCU and may optimally be implemented using bipolar or MOS fabrication technologies.

Figure 13:
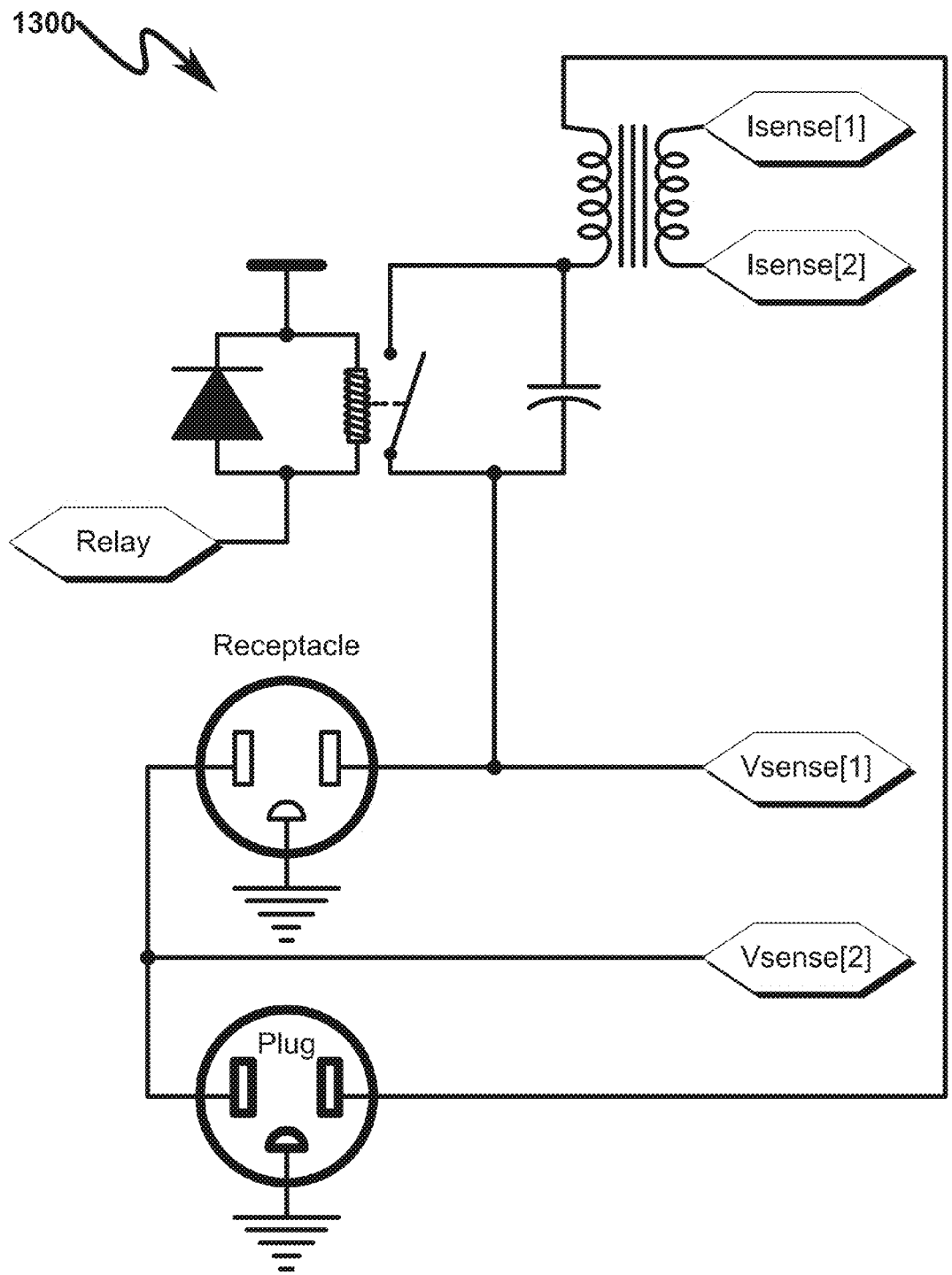
FIG. 13 illustrates an exemplary schematic of a preferred exemplary PSCU Power Switch embodiment.

Power Switch (0904)—As detailed in FIG. 13 (1300), a power relay is a gate between the line power interface power input and the output power outlet and is controlled by the transistor switch in the wireless communications interface (0903). The power relay may be protected from over-current surges by a Zener or Schottky diode.

Optional Power Monitor/Diagnostics (0905)—As detailed in FIG. 14 (1400), an optional integrated circuit (1401) may be incorporated for measuring energy and the self-diagnostic purposes.

One skilled in the art will recognize that these functional blocks may be implemented in a wide variety of ways well known to those skilled in the art of circuit design and as such are only exemplary of the techniques taught by the present invention.

Alternate Preferred Exemplary PSCU Block Diagram (1500)

Figure 15:
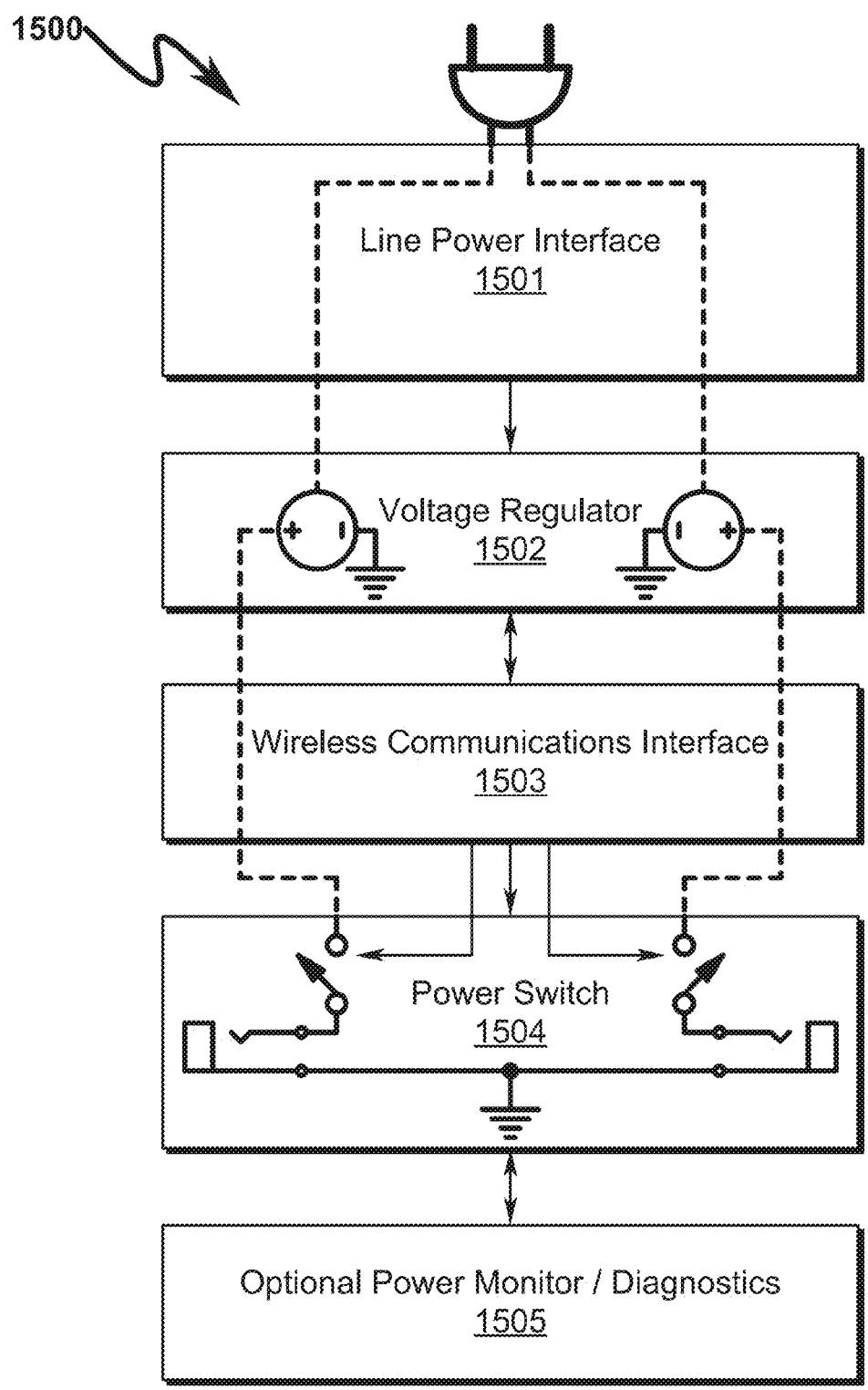
FIG. 15 illustrates an exemplary schematic block diagram of an alternate preferred exemplary PSCU embodiment.

An alternate preferred exemplary system electrical block diagram of a typical PSCU system is generally illustrated in FIG. 15 (1500), wherein the electrical system block diagram of FIG. 9 (0900) has been modified such that the line power interface (1501) supplies power to multiple voltage sources within the voltage regulator subsystem (1502). These voltages sources may be independently configured to supply power based on configuration information received from the wireless communication interface (1503). The power switch module (1504) incorporates multiple power output jacks that can be independently switched on/off depending on information received from the wireless communications interface (1503).

With this alternate preferred exemplary embodiment, the concepts generally illustrated in FIG. 9 (0900) may be expanded to produce a general-purpose line power adapter with multiple power jack outputs that can be individually adapted to support a wide variety of battery powered devices. This configuration permits a single "smart" PSCU power adapter unit to be constructed that may support any number of host computing units, each having different power supply requirements, different battery charge/discharge characteristics, and different consumer use profiles. One skilled in the art will readily be able to take the teachings of FIG. 9 (0900)-FIG. 14 (1400) and be able to affect the details of the system block diagram generally illustrated in FIG. 15 (1500).

Charge/Discharge Cycles Adaptation to Battery Characteristics

The present invention anticipates that the charge/discharge cycles applied to the battery utilized with the present invention will be varied to adapt to environmental conditions and other factors in an attempt to optimize battery life. As a battery ages, it holds less energy capacity (see FIG. 30 (3000)). The effect of not charging to full and discharging to empty also has an impact on prolonging the battery life (see FIG. 31 (3100)). The effect of slow charge/discharge cycles can also promote prolonged battery life (see FIG. 32 (3200)).

The factors in adapting the battery controller schemes to these battery characteristics include:
  The average discharge time, proportional to the battery capacity;
  The number of total charges since the first use of battery; and
  The age of the battery—how long since the battery is in use.

Configuration Parameters
  Typical charge/discharge configuration parameters associated with the present invention as applied in this context include the following:
    threshold—L_H and L_L; and
    slow or fast charge.

The adaptation algorithm for slow/fast charging is described below. Many hosts provide APIs for specifying fast or slow charge. Fast charge means providing high current and slow charge means providing low current (see FIG. 32 (3200)).

The charging adaptation schemes are typically based on the above factors. The adaptation is generally applied to the auto modes of charge/discharge configuration.

A typical adaptation scheme of auto charge/discharge configuration is now described. The following is one example of the auto adaptation of charge/discharge configuration for a laptop computer. Similar formulas can be developed for other types of rechargeable batteries.
  alpha=age (days)/normal battery life span, where normal battery life span=5*365 days for example, depending on the type of battery
  beta=total number of charges so far/maximum number of charges that the battery can have (e.g., maximum number of charges that the battery can have=10000) depending on the type of battery.

The formula to calculate L_H and L_L for auto adaptation of charge/discharge configuration may be implemented as follows:

$L\_H\_0$=charge stop threshold initial value (e.g., 90%);

$L\_L\_0$=discharge stop threshold initial value (e.g., 10%);

$L\_H = L\_H\_0 - \max\{alpha, beta\} * 20\%$; and $L\_L = L\_L\_0 + \max\{alpha, beta\} * 20\%$.

Figure 31:
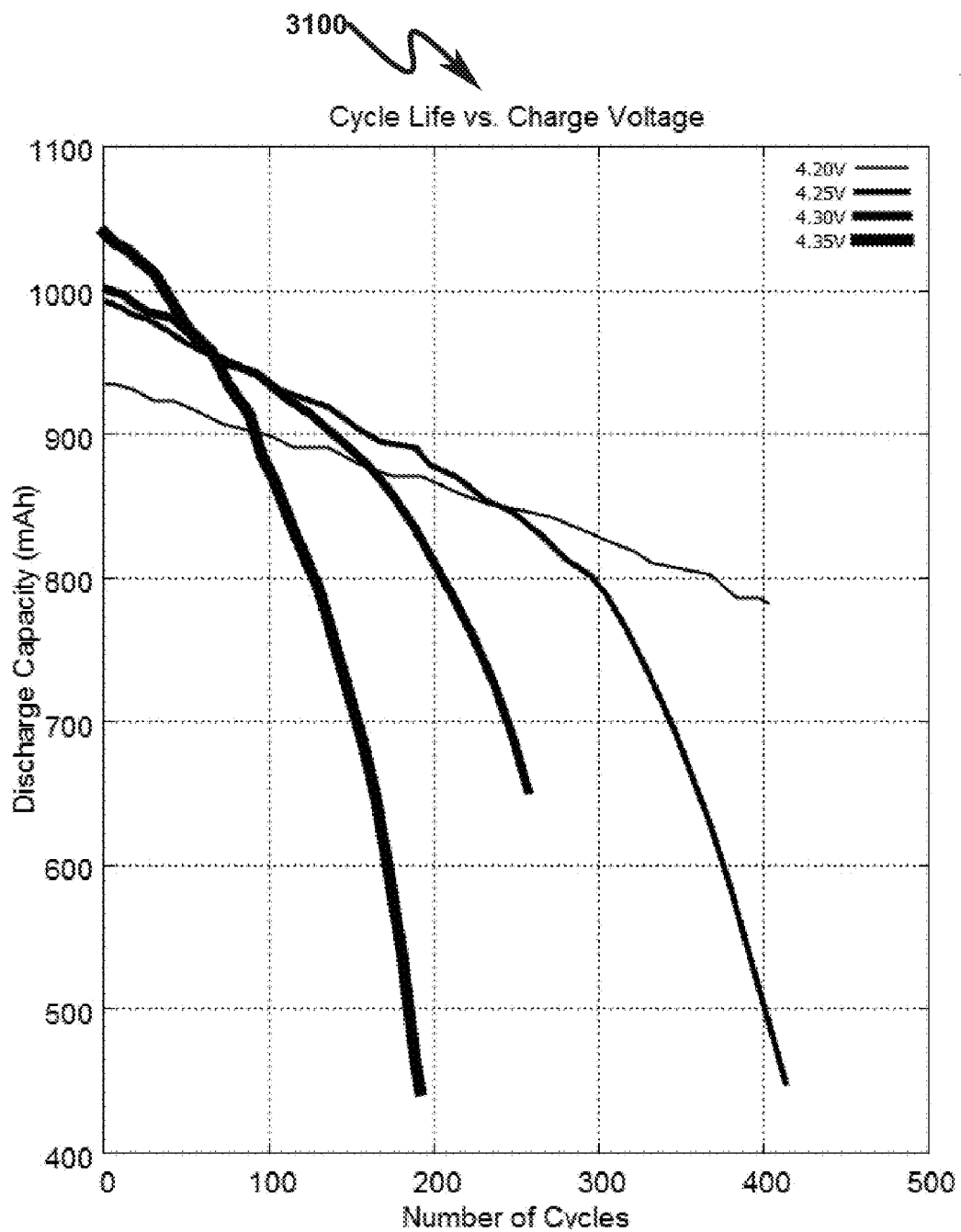
FIG. 31 illustrates typical battery capacity vs. cycle count/charging voltage characteristics.

Basically, the above formula asserts that as the battery ages, the algorithm must lower the L_H and increase the L_L, as suggested by FIG. 31 (3100).

The formula to decide to use slow or fast charges is as follows:

Charge mode=fast charge if $\max\{alpha, beta\} < 30\%$; slow charge mode, otherwise.

This formula assumes that as battery ages, the system should use slow charge.

It should be noted that in the above discussion, the test threshold percentages (20%, 30%) are related to battery chemistry and can be reconfigured based on specific battery types in a wide variety of application contexts.

System Control Flow Detail (1600)-(2600)

Flowchart Overview

Figure 16:
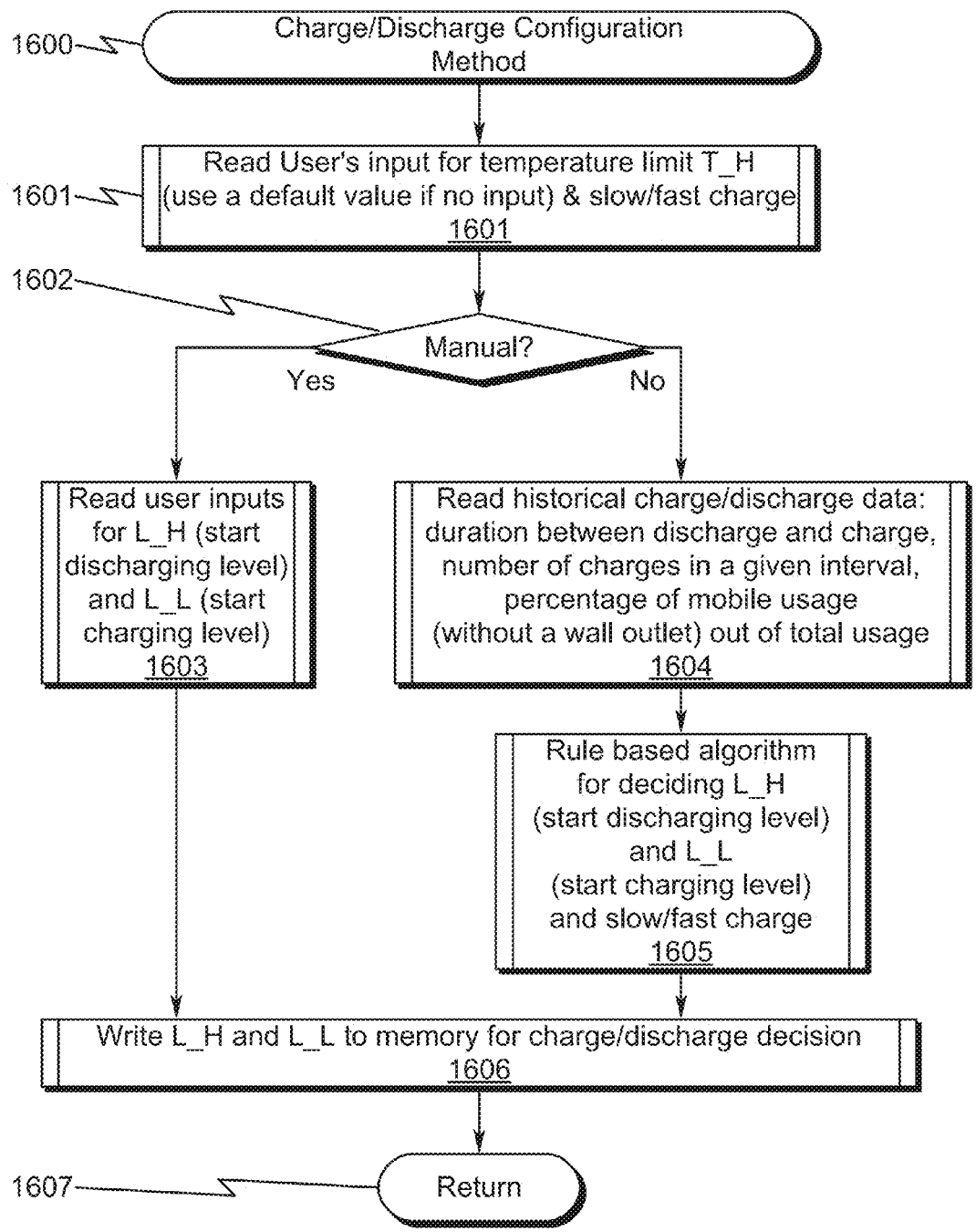
FIG. 16 illustrates a detailed flowchart of a preferred exemplary charge/discharge configuration method used in some preferred exemplary invention embodiments.
Figure 18:
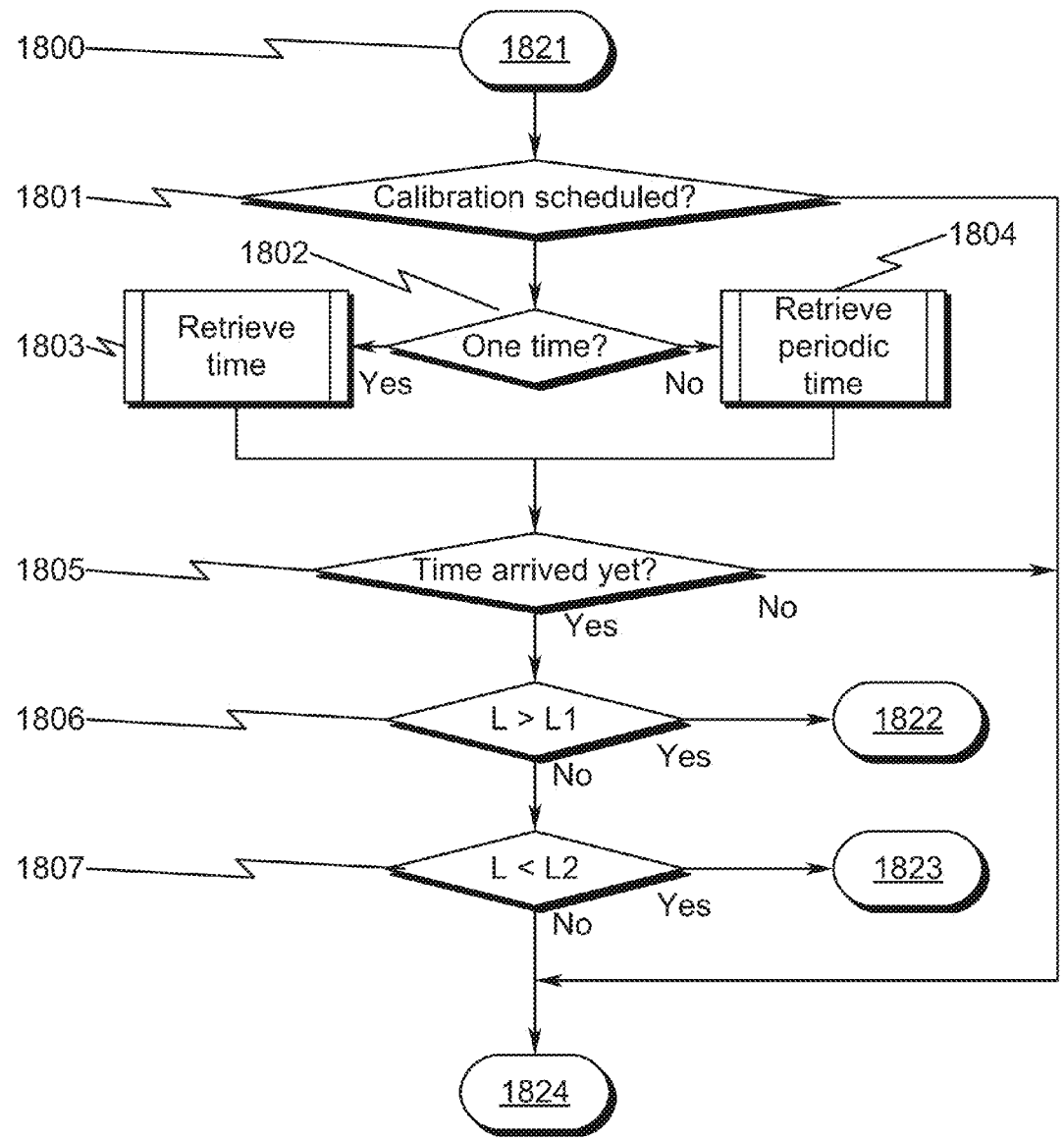
FIG. 18 illustrates page 2/2 of a detailed flowchart of a preferred exemplary charge/discharge method used in some preferred exemplary invention embodiments.
Figure 19:
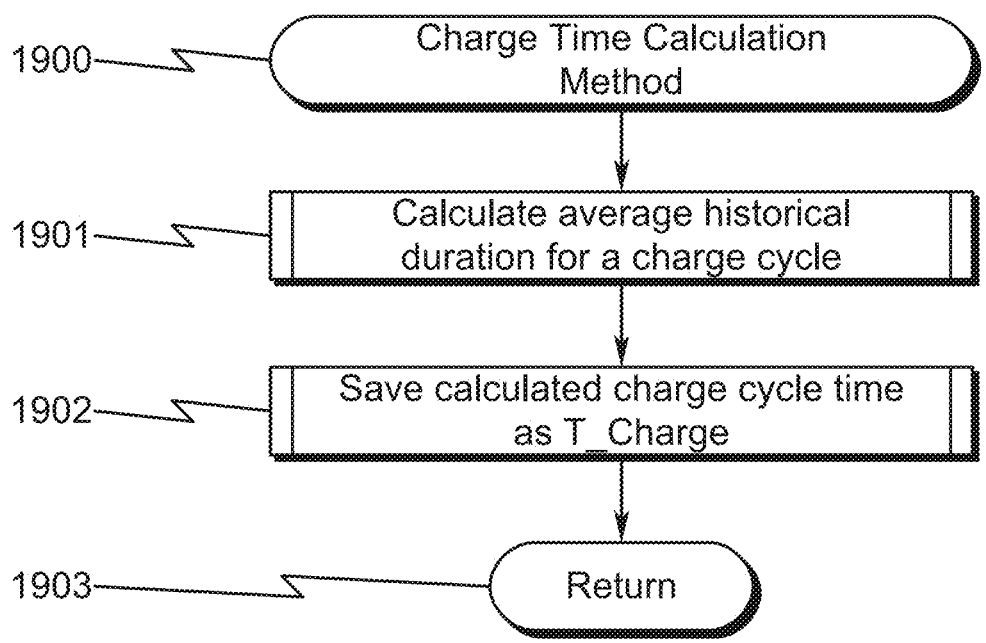
FIG. 19 illustrates a detailed flowchart of a preferred exemplary charge time method used in some preferred exemplary invention embodiments.
Figure 20:
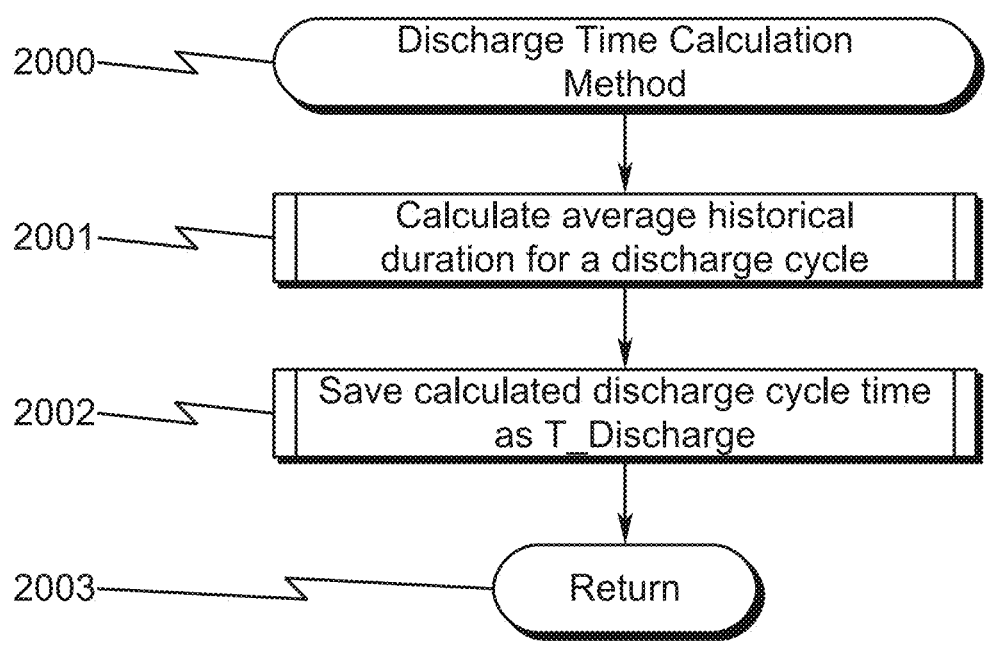
FIG. 20 illustrates a detailed flowchart of a preferred exemplary discharge time method used in some preferred exemplary invention embodiments.
Figure 21:
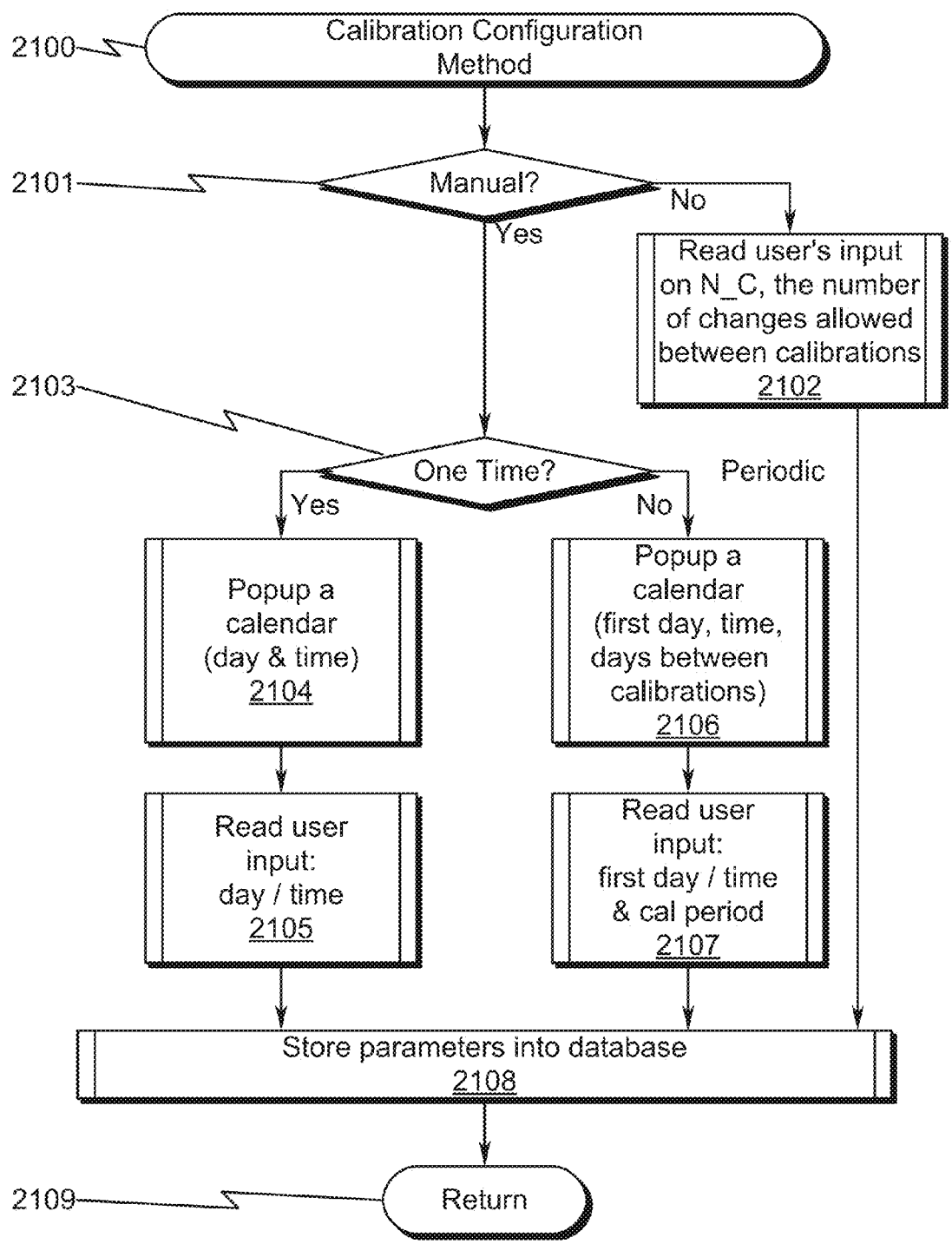
FIG. 21 illustrates a detailed flowchart of a preferred exemplary calibration configuration method used in some preferred exemplary invention embodiments.
Figure 22:
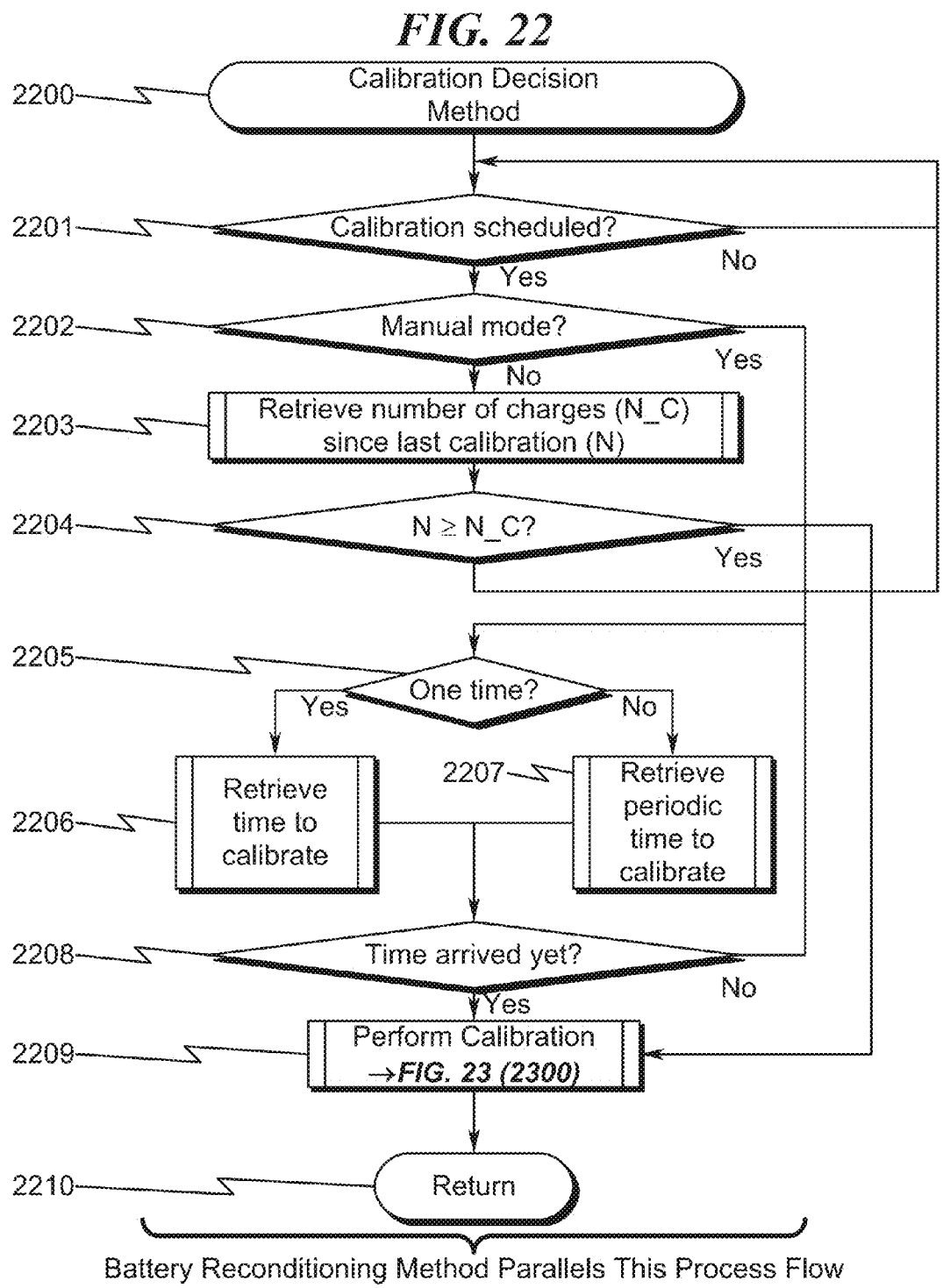
FIG. 22 illustrates a detailed flowchart of a preferred exemplary calibration decision method used in some preferred exemplary invention embodiments.
Figure 26:
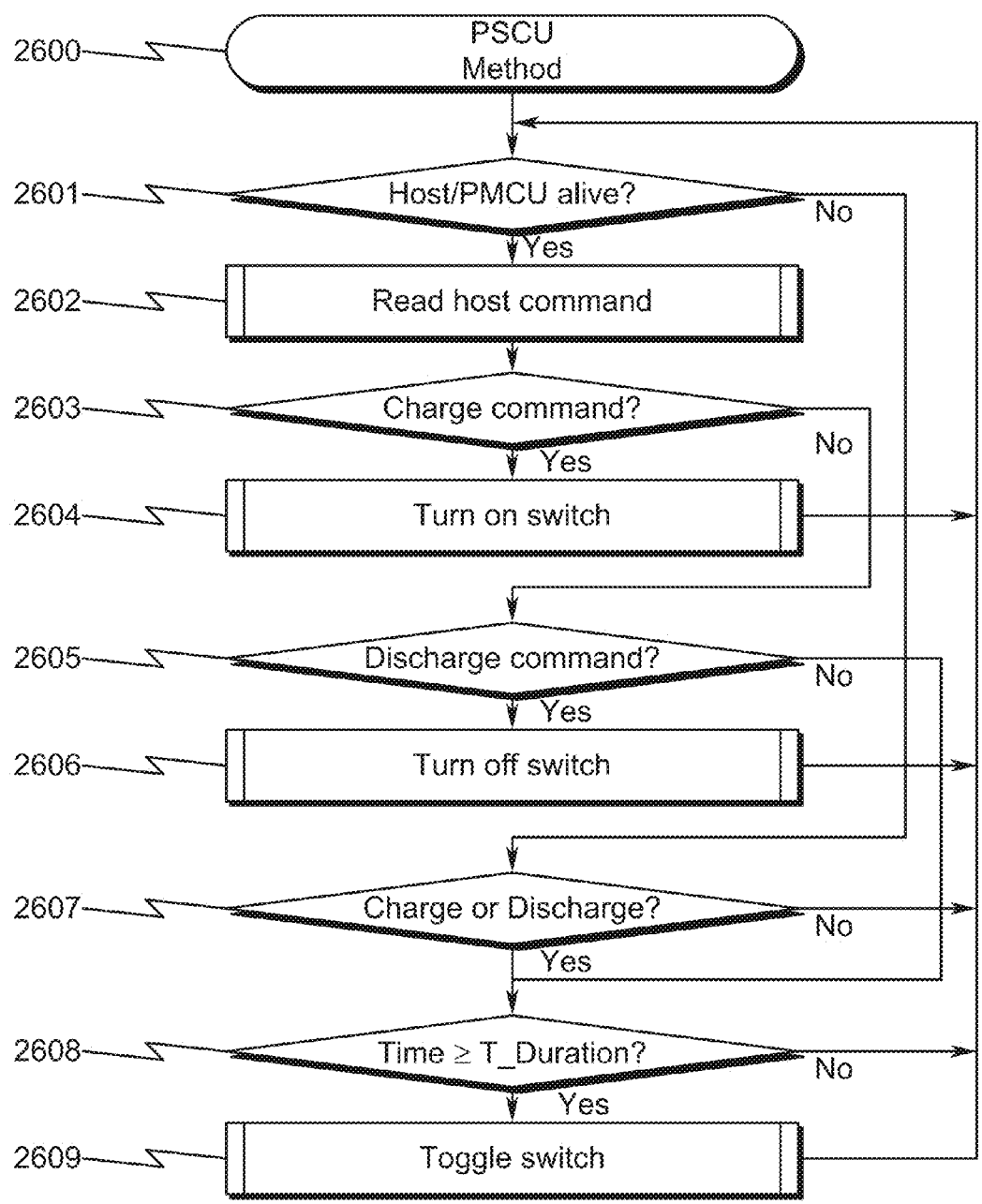
FIG. 26 illustrates a detailed flowchart of a preferred exemplary PSCU method used in some preferred exemplary invention embodiments.

While the methods taught by the present invention may vary widely based on application, the general control flowchart depicted in FIG. 4 (0400) may in many circumstances be advantageously embodied in detail as illustrated in FIG. 16 (1600)-FIG. 26 (2600). Within this context, FIG. 16 (1600) depicts an exemplary methodology to configure battery charge/discharge cycles, FIG. 17 (1700)-FIG. 18 (1800) depicts an exemplary method of implementing battery charge/discharge cycling, FIG. 19 (1900) depicts an exemplary method of calculating battery charge time, FIG. 20 (2000) depicts an exemplary method of calculating battery discharge time, FIG. 21 (2100) depicts an exemplary method of configuring battery calibration, FIG. 22 (2200) depicts an exemplary method of determining if a battery calibration is required, FIG. 23 (2300) depicts an exemplary method of implementing a battery calibration cycle, and FIG. 24 (2400) depicts an exemplary method of implementing a battery recondition cycle.

Calibration cycles may have two modes: manual schedule mode and automatic mode. In manual schedule mode consumers simply
  start a calibration one time (e.g., 8 hours from now); and/or
  schedule calibrations periodically (e.g., every 30 days).
Automatic calibration may also be implemented using automated triggering mechanisms. Calibration typically requires that the battery be fully discharged and followed with a full charge. This may be done a number of times, with twice being typical.

Battery Recondition Cycles
  Within this context a battery recondition cycle is to restore the capacity of a battery. This process takes the same steps as a battery calibration except the charge/discharge cycles may be more than two times, and for some batteries, there may be a pause of several minutes between complete battery discharge and charging again. Since this process mimics that of the battery calibration procedures, it is not replicated in the drawings as one of ordinary skill in the art familiar with the disclosed calibration process could generate the recondition process from this disclosed calibration flow.

Charge/Discharge Cycle Modes

There are two modes for setting charge and discharge configuration: manual and auto mode. In manual mode, consumers setup the conditions for starting a charge and discharge. In auto mode, the software decides when to charge and discharge. FIG. 16 (1600) generally illustrates this process.

The following are the conditions that trigger the switch on (charge) or switch off (discharge):

Charge

Figure 17:
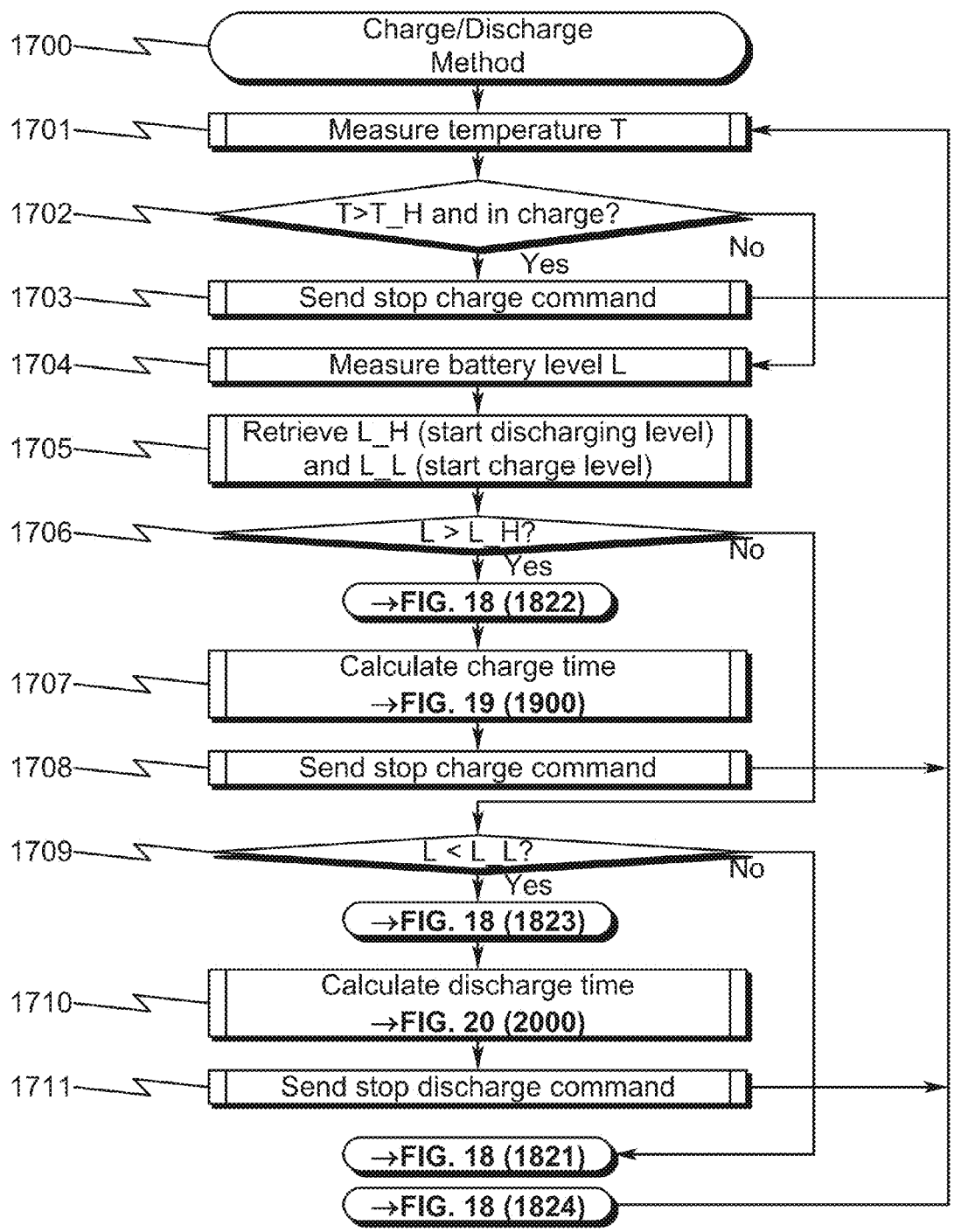
FIG. 17 illustrates page 1/2 of a detailed flowchart of a preferred exemplary charge/discharge method used in some preferred exemplary invention embodiments.

Referencing FIG. 17 (1700), if the device temperature is below a threshold (a customer configurable parameter) T_H (for example 120 degree F.), then any one or more conditions below will trigger the charging:
- (1) (Manual) When battery level is below a preset low level L_L, for example, 20%.
- (2) (Manual) When a scheduled time to charge, for example, 5:00 AM today day, is arrived and the battery level is below a preset low level L_2, for example, 30%. Note: The threshold here is usually higher than L_L; otherwise, charge condition (1) would kick in.
- (3) (Manual) The scheduled time can be one-time or periodic.
- (4) (Auto mode) Based on the user habit/profile. See the related discussion below.
- (5) As part of calibration, see below Discharge
- (1) When the temperature is above a preset high level T_H, for example, 80%.
- (2) When a scheduled time to discharge is arrived and the battery level is above a preset high level L_L, for example, 70%. The threshold here is usually lower than L_L. Otherwise, discharge condition (1) would kick in.
- (3) (Manual) The scheduled time can be one-time or periodic.
- (4) (Auto mode) Based on the user habit/profile. See the related discussion below.
- (5) As part of calibration, see below FIG. 17 (1700) (Charge/discharge) generally illustrates the methods associated with charge and discharge.

PMCU/PSCU General Control Flowcharts

Figure 25:
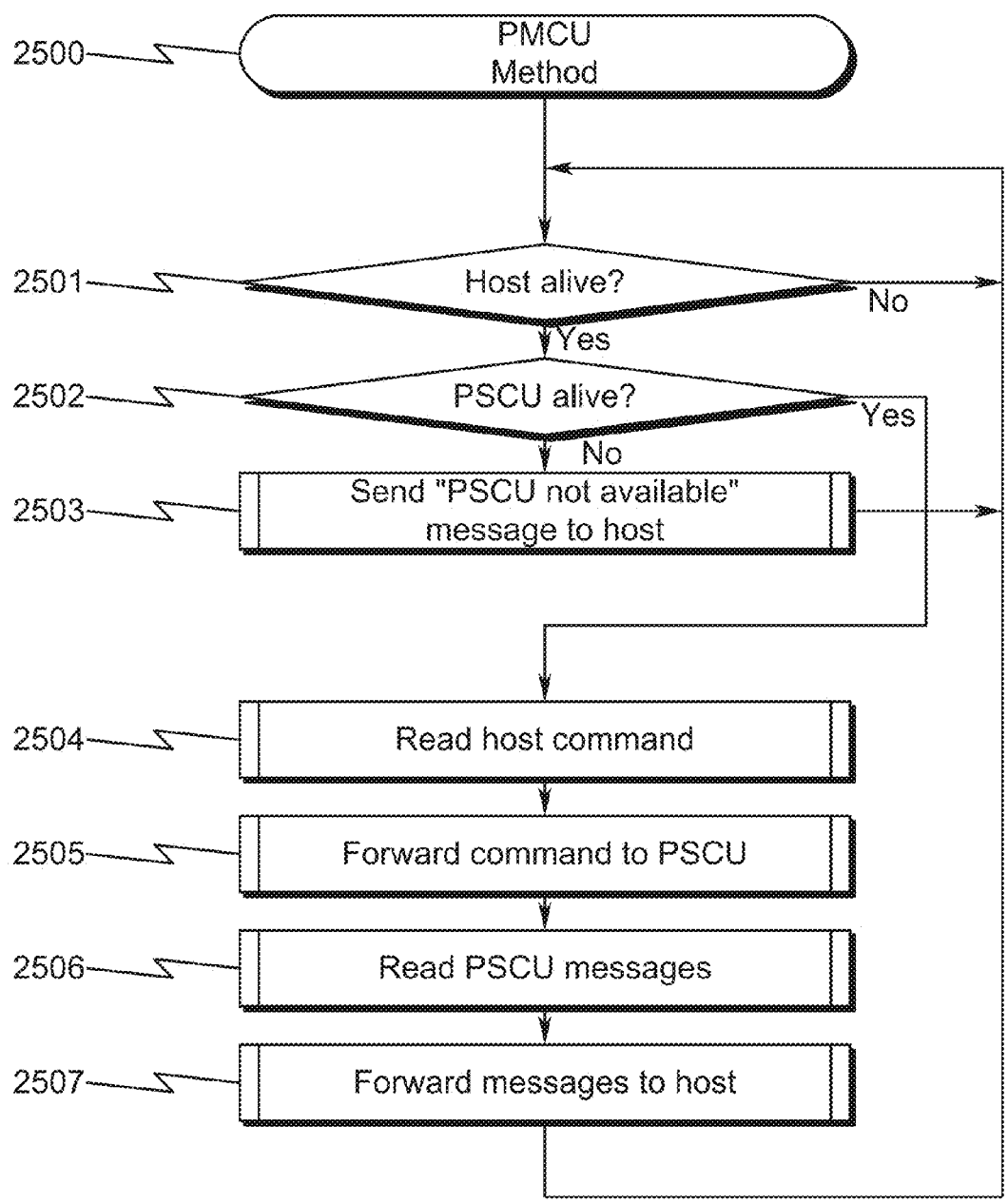
FIG. 25 illustrates a detailed flowchart of a preferred exemplary PMCU method used in some preferred exemplary invention embodiments.

An exemplary preferred embodiment of control flow within the PMCU is generally illustrated in FIG. 25 (2500) and that of the PSCI generally illustrated in FIG. 26 (2600).

PMCU General Control Flowchart (2500)

The PMCU control flow depicted illustrated in FIG. 25 (2500) generally comprises the following method steps:
- (1) Determining if the host is available, and if not, proceeding to step (1) (2501);
- (2) Determining if the PSCU is available, and if so, proceeding to step (4) (2502);
- (3) Issued an advisory that the PSCU is not available and proceeding to step (1) (2503);
- (4) Reading a host command (2504);
- (5) Transmitting the host command to the PSCU (2505);
- (6) Reading any PSCU messages (2506); and
- (7) Forwarding the PSCU messages to the host and proceeding to step (1) (2507).

One skilled in the art will recognize that these method steps may be augmented or rearranged without limiting the teachings of the present invention.

PSCU General Control Flowchart (2600)

The PSCU control flow depicted illustrated in FIG. 26 (2600) generally comprises the following method steps:
- (1) Determining if the host is available, and if not, proceeding to step (7) (2601);
- (2) Reading a host command (2602);
- (3) Determining if the host command is a charge command, and if not, proceeding to step (5) (2603);
- (4) Turning on the PSCU power switch and proceeding to step (1) (2604);
- (5) Determining if the host command is a discharge command, and if not, proceeding to step (8) (2605);
- (6) Turning off the PSCU power switch and proceeding to step (1) (2606);
- (7) Determining if a charge or discharge cycle is in progress, and if not, proceeding to step (1) (2607);
- (8) Determining if the charge/discharge timer has elapsed, and if not, proceeding to step (1) (2608); and
- (9) Toggling the state of the PSCU power switch and proceeding to step (1) (2609).

One skilled in the art will recognize that these method steps may be augmented or rearranged without limiting the teachings of the present invention.

Historical Battery Charge/Discharge Data

Overview

The present invention in some preferred embodiments may make use of past battery charge/discharge history in several circumstances, including but not limited to the following:

Calibration. As mentioned earlier, calibration setup has two modes (see FIG. 21 (2100)): manual schedule mode and auto mode. In auto mode, the software calculates when the next calibration should be and carries it out at that time. The calculation is based on the historical battery charge/discharge data. To be specific, if the battery is used and charged and discharged frequently, a calibration is needed more often in the auto mode. The algorithm for calculating the time for the next calibration may be based on (for example) the number of charges/discharges for a given period, or since last calibration. A reference algorithm is If (number of total charges>n) then Do_Calibration For charging and discharging. Again, the charging and discharging has manual mode and auto mode (see FIG. 17 (1700)). In manual mode, consumers set the high battery level for discharging and low battery level for charging. In auto mode, the software references the historical charging/discharging levels and the number of charging/discharging cycles in a given period, and the durations between charging and charging.

One use case scenario: If the computer is always in heavy use, then the duration between discharge and discharge is quite short (4 hours instead of 8 hours, for example). As a result, software may set the level for discharging (stop charge) a little higher than optimal, to provide more juice but at the expenses of not being optimal. On the other hand, if the computer is not in heavy use, the level can be set at the "optimal" level.

Another user case: If the historic data shows that the consumers use the laptop more in the mobile situation (without wall power), then every charge will set the L_H a little higher and L_L a little lower, while still remain in the range of good level thresholds.

The calculation of charge/discharge duration. As mentioned earlier, during charge/discharge, if the host is on, then the host software measures the battery level, and decides when to stop charge and discharge. But if the laptop is shutdown during the charge and discharge, then the software is not available and PSCU depends on the expiration of an expected charge/discharge time to stop charge or discharge. The calculation of the expected charge/discharge time is based on historical data. See FIG. 19 (1900)-FIG. 20 (2000).

Historical Database Contents

The historical database in some preferred embodiments stores the following pieces of information:
(1) Number of charging and discharging in a given period (30 days).
(2) Durations of each discharging (use of battery) and charging (using wall power).
(3) Levels of each charging and discharging.
(4) The percentage of mobile usage (without wall power) of the device running time in a given time interval (e.g. 30 days).

One skilled in the art will recognize that this list is not all inclusive nor exclusive of other data that may be used and stored in this context.

System Module Description Detail

As illustrated in FIG. 3 (0300), the present invention may be typically embodied in a system comprising two hardware modules, called the PMCU and the PSCU. In addition, the system typically contains software residing in PMCU, PSCU and the Host Computing Device (defined below). This software is termed Control Software, which consists of three software modules respectively running on Host Computing Device, PMCU and PSCU. Together, the PMCU, PSCU, and Control Software achieve the desired features listed above.

In summary, the PMCU, PSCU and Control Software form a control system, where the PMCU works with the Host Computing Device to get the battery status and makes a decision to charge/discharge the battery. This decision is sent to the PSCU, which turns on and off the power supply for charging the battery.

Exemplary Functionality

To summarize, the present invention in some preferred embodiments provides the following functionality:
Controls the battery charging and discharging based on the preset upper and low limits and user profile.
Schedules and carries out the battery calibration.
Schedules and carries out the battery recondition for some types of batteries.
Keeps track of the battery charge and discharge history in terms of charge/discharge duration and latest charge/discharge time.
Keeps track of the user battery usage profile with respect to its use with and without AC power.

The Host Computing Device is the device where the rechargeable battery is used. The PMCU is connected with the Host Computing Device through a communication link. The AC/DC adaptor feeds DC current to the Host Computing Device. The PSCU is inserted between AC/DC adaptor and the wall AC power outlet (as shown in FIG. 3 (0300), FIG. 5 (0500), FIG. 7 (0700)) or inserted between AC/DC adaptor and the Host Computing Device (FIG. 6 (0600), FIG. 8 (0800)). The PSCU can turn on and off the connection of the AC/DC adaptor with the wall AC power outlet or the connection between the AC/DC adaptor and the Host Computing Device. This effectively turns on and off the power supply to the Host Computing Device.

This functionality is further described as follows:
The invention generally comprises two parts as illustrated in FIG. 3 (0300). These two parts work together along with the software to achieve the system goal: turn on and off the battery charging system at the "right moment" as described herein so that battery life is prolonged.
Host Computing Devices include, but are not limited to, (1) mobile PC such as laptop/notebook, tablet computer, etc; (2) cell phones; (3) any consumer portable devices where a rechargeable battery is used.
The communication link between PMCU and the Host Computing Device can be, but not limited to, a USB connection, UART connection, or Ethernet connection.
The PMCU communicates with the Control Software running on the Host Computing Device. The software program has, but is not limited to, the following capabilities
(1) Read the type of the Host Computing Device and the type of the rechargeable battery;
(2) Read from Host Computing Device hardware the battery energy level, the system power usage profile, and system temperature, among other things;
(3) Record the battery charging and discharging history, such as the charging/discharging duration and battery charging/discharging levels;
(4) Record the date of the last battery calibration and battery recondition;
(5) Record the user profiles of the battery usage (e.g., typical number of hours he/she would be using his/her laptop in a situation where no power outlet is available).
The above mentioned software, together with the PMCU, makes a decision on starting or stopping the charging of the rechargeable battery. The decision is based on, but not limited to:
(1) the best charging level and the best discharging level (the lowest level the battery is allowed to reach) set by user or based on the battery type and battery usage user profiles;
(2) the need to do a battery calibration or condition; and
(3) the current system temperature (to stop charging when the system temperature is too high or too low as defined by preset parameters).
There are two types of charge and discharge cycles:
(1) normal charge and discharge, where the battery is charged/discharged to desired level;
(2) battery calibration or recondition, where the battery will be fully discharged and then fully charged.
The decision to do a normal charge/discharge cycle or a calibration/recondition cycle is communicated with the PMCU along with additional information such as current battery level, the battery level to charge/discharge to, the estimated time to charge/discharge. This information is recorded in the PSCU. Storing the information locally in the PSCU is important when the software on the Host Computing Device for any reason no longer communicates with the PSCU. With this information, the PSCU can carry out the charge and discharge functions autonomously.

The PMCU relays the decision to the PSCU. The decision comes with the same additional information PMCU gets from the Host Computing Device. The PSCU, in turn, turns on and off the connection of AC/DC adaptor to the Host Computing Device that powers the charging system. The PSCU stores the additional information in its local memory in case it operates in a "stand alone" mode.

The PSCU can be inserted between the wall power outlet and the AC/DC adaptor to turn on and off the AC supply as generally illustrated in FIG. 5 (0500), or alternatively inserted between the DC output of the AC/DC adaptor and the Host Computing Device as generally illustrated in FIG. 6 (0600).

The communication between the PMCU and the PSCU is preferably wireless, such as WiFi, BLUETOOTH®, ISM, and ZIGBEE®, to mention a few exemplary wireless technologies. This communication is not limited to wireless and can be a wired connection.

The PMCU, upon receiving the "start" decision from the Host Computing Device Software, sends a command through a communication means to the PSCU. The PSCU, upon receiving the command, turns on (switch on) the connection of the power line either on the AC side or the DC side.

The PMCU, upon receiving the "stop" decision from the Host Computing Device Software, sends another command through the communication means to the PSCU. The PSCU, upon receiving the command, turns off (switch off) the connection of the power line either on the AC side or the DC side.

The PMCU additionally has a way to warn users when the power adapter needs to but is not already plugged in to a power outlet. This can be a visual (flashing LED) or auditory based signaling.

When the Host Computing Device no longer communicates with the PSCU, the PSCU will resume a "stand alone" mode, and carry out the current charging and discharging based on its locally stored information as discussed previously. This may happen, for example, when the Host Computing Device power is turned off.

The PSCU, when not receiving any command from the PMCU for a preset timeout, sends an "are you alive" message to the PMCU several times (e.g., 3 times). If an acknowledge signal is received from the PMCU for any of the "are you alive" messages, the PSCU will reset the timeout timer and continue the normal wait for commands from PMCU and the next timeout. If no acknowledge is received from the PMCU, the PSCU will resume a "stand alone" mode, carry out the current charging and discharging based on its locally stored information as discussed previously. This happens when PMCU no longer communicates with PSCU for any reason.

Preferred Exemplary Embodiment

While the present invention may be embodied in many forms, some are preferred, including an application targeting laptop computers. The invention is equally applicable to other types of computing devices detailed herein.

The PMCU in this instantiation is a small form factor USB dongle that is connected with a laptop to monitor the PC battery level and the battery temperature. The PSCU is a small connector "inserted" between the wall power outlet and the laptop power AC/DC adaptor. The USB dongle is generally so small that customers can insert it into a laptop and never have to take it off. The connector can be attached to the end of the AC/DC adapter that is plugged into the wall power outlet and never needs to be taken off.

This is a "non-intrusive" implementation. Consumers may purchase the kit and plug the PMCU piece into the laptop and the PSCU into the power supply. Once this installation is complete the system/method implemented by the PMCU/PSCU combination works to extend the life of the battery. This system may transmit a friendly signal to the operator should the wall outlet power adapter need to be inserted into an AC power source.

The PMCU and PSCU both employ an ultra-low power RF transceiver. The PMCU draws power through the USB dongle from the Host Computing Device. The PSCU draws the power from the AC power supply through a regulator. Communication is conducted wirelessly between the PMCU/PSCU. The PMCU has a microcontroller which converts the information from the Host Computing Device into a frame to be sent by the RF transceiver. The PSCU has a microcontroller to control a relay. When a command is received by the PSCU RF transceiver, the microcontroller converts the commands into the electrical "high" or "low" level that triggers the relay, which opens and closes the link between the AC/DC adaptor and the wall power outlet. This will enable and disable the battery charging. The "intelligence" is in the USB dongle and the Host Computing Device software, which communicates with the PC energy management system and makes "open" or "close" decision.

The decision to start and stop the charging in this implementation is based on the upper threshold S(U) and lower threshold S(L). The S(U) and S(L) themselves are the functions of the battery type, the current power usage and the user profile. For example, the battery level of around 40% is the best level for some batteries in terms of "prolonging the battery life". So in normal situation, S(U) can be set to 50% and S(L) can be set to 30%. But if the user needs to work in an environment where there is no power outlet for extended time, say, 3 hours, then S(U) and S(L) can be raised higher to 80% and 60%.

The limits can either be set by the users through a user interface or automatically by the system based on the user profile. The user profile is statistically obtained from the user's usage pattern recorded in the memory.

A user interface is provided on the laptop, where a user can setup S(U) and S(L) or let the system select these parameters, and schedule calibrations and reconditions. A user also receives information from the UI on the current battery level, the estimate of charging/discharging time, among other things.

Alternate Preferred Exemplary Embodiment

Most portable devices today have embedded WiFi capability. In this an alternate preferred exemplary embodiment of the present invention, the PMCU comprises embedded WiFi module of the Host Computing Device and there is no separate hardware associated with the PMCU. The PSCU comprises an embedded WiFi module, which communicates with the PMCU that is part of the Host Computing Device peripheral complement. The remainder of the system/method functionality remains unchanged except for this hardware alignment.

PMCU to PSCU Communications

While many methods of communication between the PMCU and PSCU are anticipated, several are preferred, including but not limited to:

a wireless hardware interface;
a BLUETOOTH® wireless hardware interface;
a USB hardware interface;
a UART hardware interface;
a serial hardware interface;
a parallel hardware interface;
an Ethernet hardware interface; and
a wireless Ethernet hardware interface.

One skilled in the art will recognize that a wide variety of wired and/or wireless data transmission methodologies may be utilized to implement the communication link between the PMCU and the PSCU.

Environmental Compensation

The present invention anticipates that a wide variety of environmental factors may be used to modify the battery charge/discharge cycling under control of the disclosed system/method herein. The present invention specifically anticipates that environmental information (including but not limited to ambient temperature and/or battery temperature) may be extracted from the host computer system for use in determining the schedule and duration of battery charge/discharge cycles. Various APIs are typically available to obtain this information within the host computer context.

Within the context of various host computer systems there is typically resident software on the host that monitors the battery level, temperature, power mode ("on battery" or "on wall power"), and other modes (such as power save modes). This software can modify certain modes, such as power saving modes to enable or disable such modes. This latter ability may be utilized when calibrating the battery.

On laptops, WINDOWS® or LINUX® provide software libraries (API) to support an industry standard called Advanced Configuration and Power Interface (ACPI). ACPI allows applications to query the drivers for battery levels and the laptop power mode (powered by battery or wall power), enable or disable the power save mode. The present invention may use that software to monitor the battery levels on laptops. For other types of devices such as Android based phones, there are Android APIs for getting the similar battery information. One skilled in the art will recognize that this software is platform and application specific.

During the charge/discharge, knowledge of when the charge/discharge is completed can occur as follows. If the computer is operational during the charge/discharge cycle, the host software can monitor the battery level, detect the crossing of the high and low level limits, and communicate with the PMCU/PSCU to turn on/off the switch.

However, if the host is shutdown during the charge/discharge process another technique may be used. At the start of the charge/discharge (host is always on at this moment), the host software may calculate the expected charge/discharge duration and send it to PSCU, which can complete the charge/discharge with the host live or offline.

Figure 23:
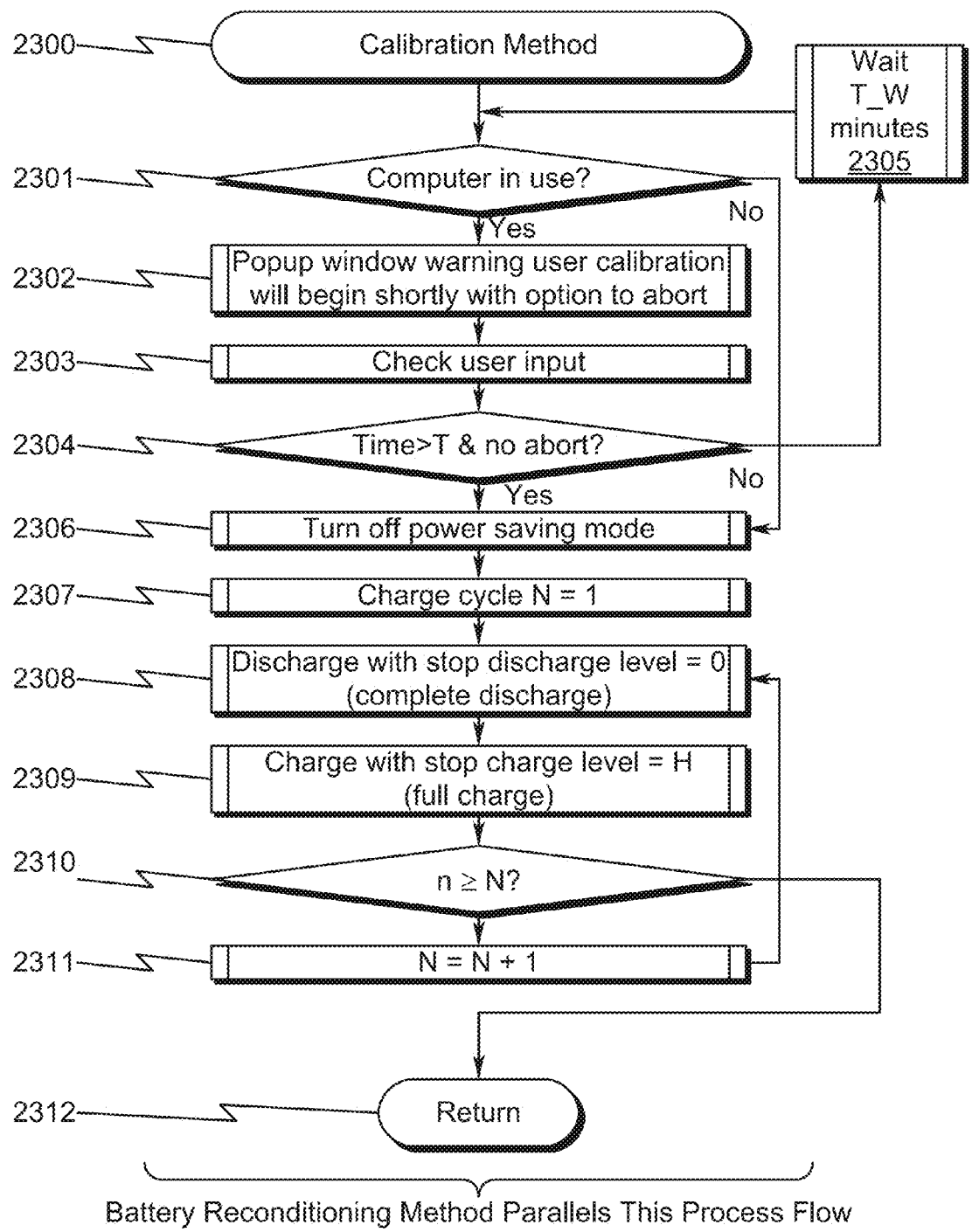
FIG. 23 illustrates a detailed flowchart of a preferred exemplary calibration method used in some preferred exemplary invention embodiments.
Figure 24:
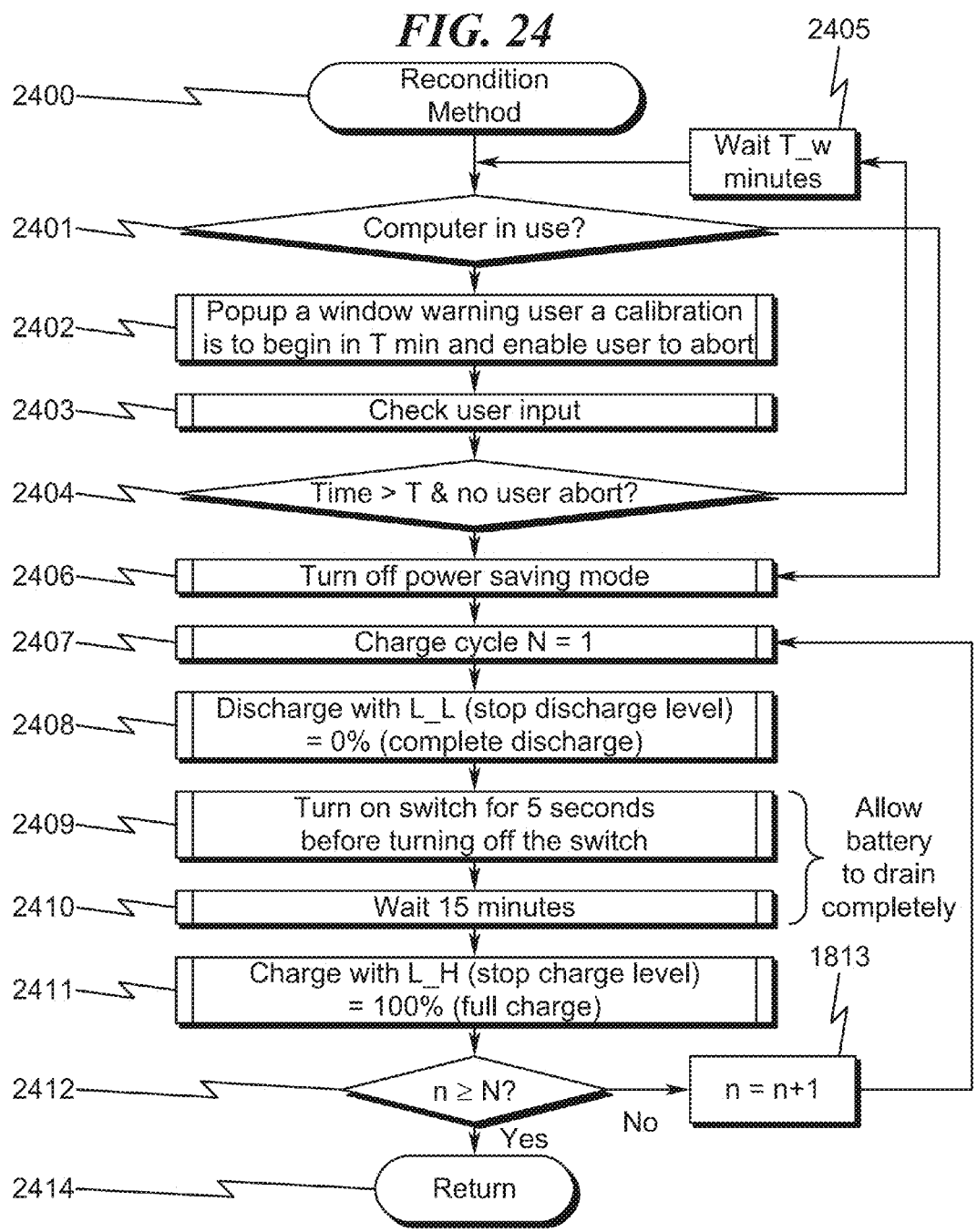
FIG. 24 illustrates a detailed flowchart of a preferred exemplary recondition method used in some preferred exemplary invention embodiments.

As illustrated in FIG. 24 (2400), during the charge and discharge cycles the PSCU may stop charge/discharge (toggle the switch) on either of the following two conditions:
(1) If the host is alive (using keep alive handshake), wait for a command from host software (through the PMCU) to stop charge/discharge; or
(2) Otherwise, wait for the expected charge/discharge duration to expire.
This mechanism is used for charging/discharge, calibration/recondition. Corresponding logic controlling the PMCU is generally illustrated in FIG. 23 (2300).

Dynamic Charging Based on Battery Characteristics

The present invention anticipates that battery charge/discharge cycles may be varied to optimize battery lifetime based on battery characteristics. The following sections discuss various battery characteristics that may be considered in this process.

Internal Resistance (2700)

Figure 27:
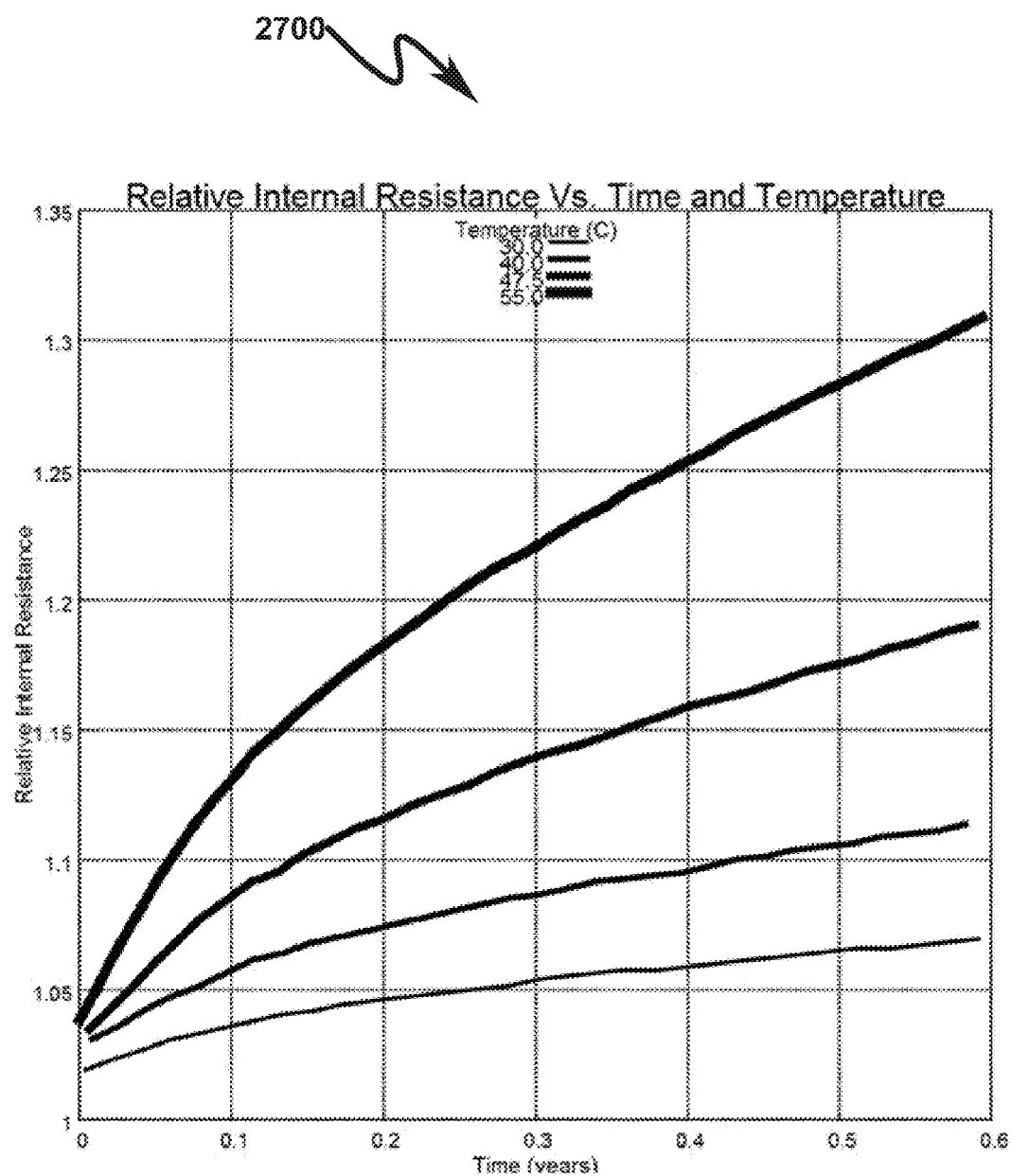
FIG. 27 illustrates an exemplary battery internal resistance vs. battery age characteristic.

As generally illustrated in the graph of FIG. 27 (2700), the internal resistance of the battery may vary widely based on time and ambient temperature. The present invention utilizes this information by attempting to reduce wasted charging power associated with high ambient temperature charges.

Battery Longevity vs. Discharge Depth (2800)

Figure 28:
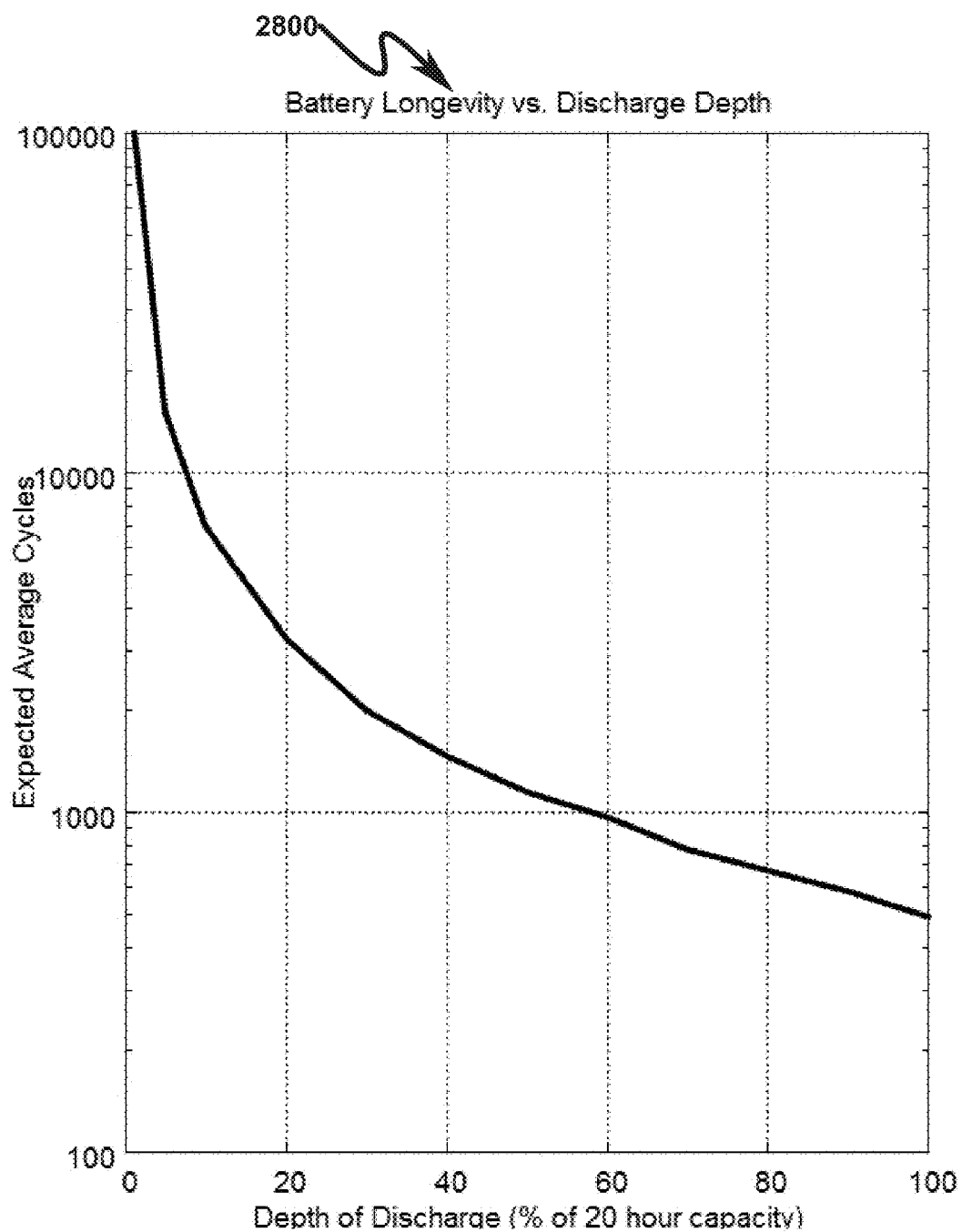
FIG. 28 illustrates an exemplary battery cycle lifetime vs. depth of discharge characteristic.

As generally illustrated in the graph of FIG. 28 (2800), the longevity of the battery may vary widely based on the depth of discharge cycles. Reduction of the discharge cycle depth can increase the number of cycles in the battery lifetime. As such, the present invention attempts to minimize discharge cycle depth where possible.

Capacity Reduction Based on Cycling (2900)

Figure 29:
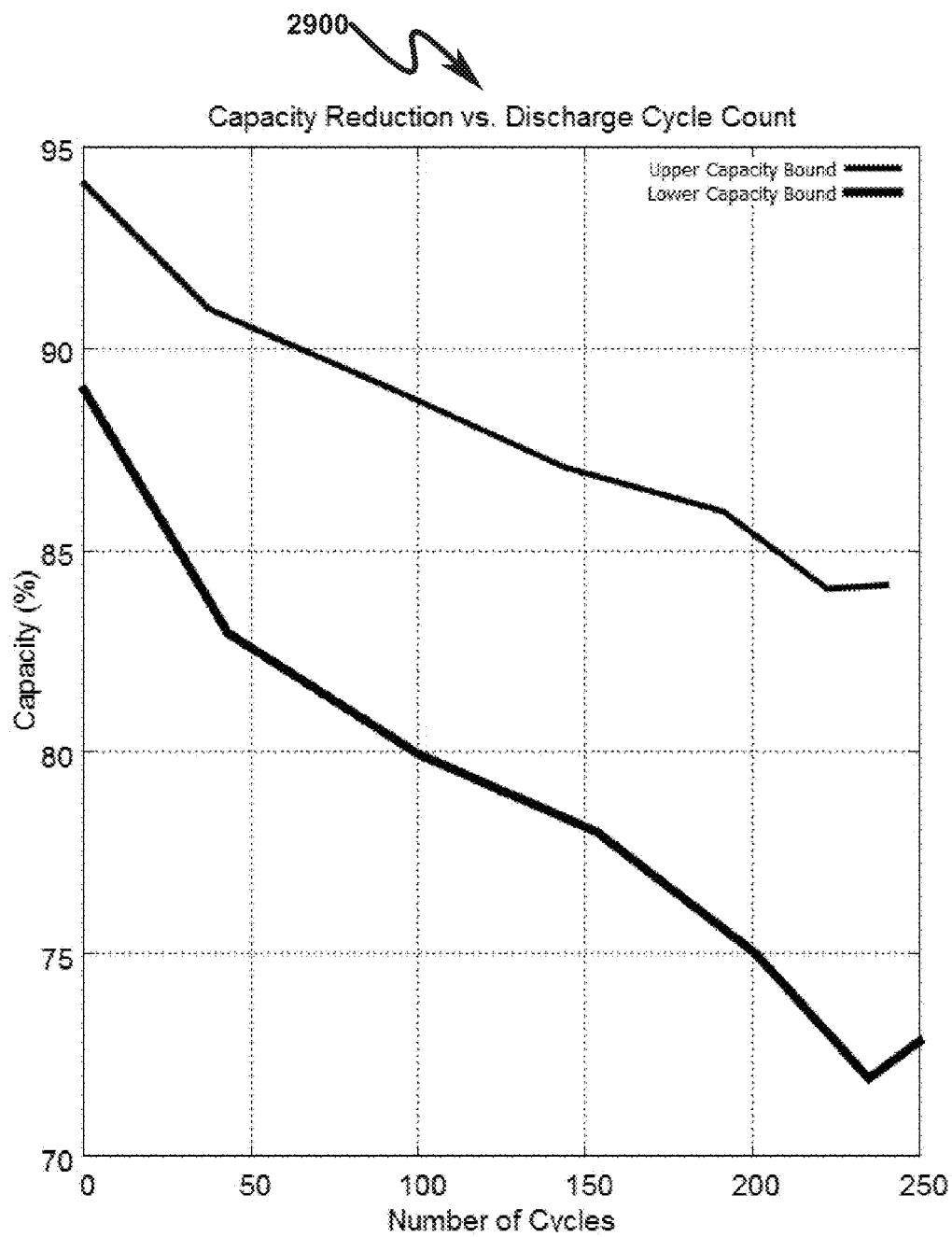
FIG. 29 illustrates an exemplary battery capacity vs. cycle count and charge voltage characteristic.

As generally illustrated in the graph of FIG. 29 (2900), the battery capacity is reduced based on the number of charge/discharge cycles. This graph depicts the performance of a pool of 1500 mA lithium-ion batteries for smartphones tested on a Cadex C7400 battery tester. All batteries show a starting capacity of 88-94 percent and decrease in capacity to 73-84 percent after 250 full discharge cycles. The present invention in some embodiments may keep track of the charge/discharge cycles to determine what constitutes a "full" battery charge.

Capacity Reduction Based on Temperature and Age (3000)

Figure 30:
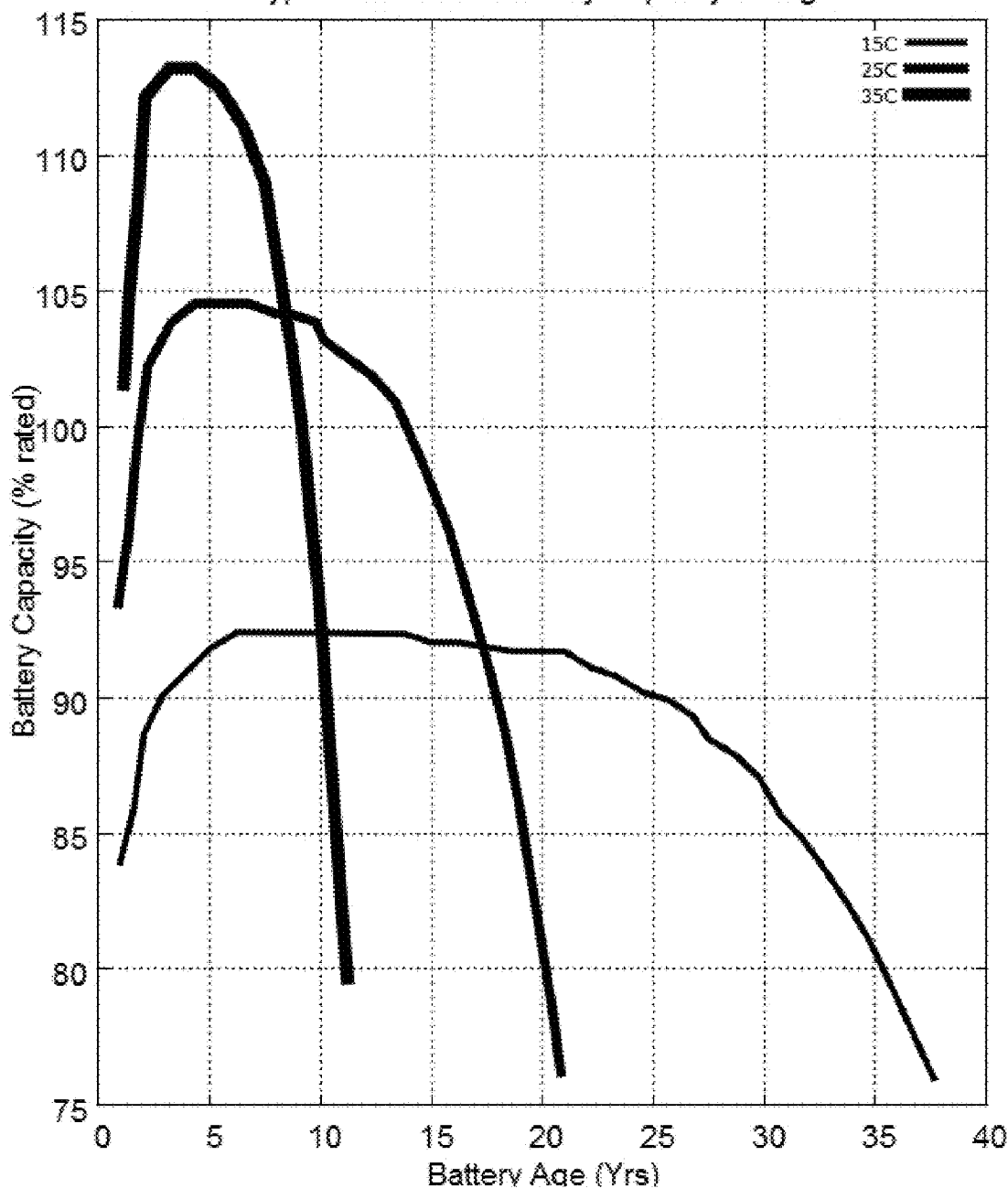
FIG. 30 illustrates an exemplary battery capacity vs. battery age characteristic.

As generally illustrated in the graph of FIG. 30 (3000), the battery capacity is reduced based on the operating temperature and age of the battery. The present invention in some embodiments may keep track of the ambient temperature to determine what constitutes a "full" battery charge and to properly account for temperature/age derating during battery discharge.

While the graph in FIG. 30 (3000) depicts the performance of lead-acid batteries, a similar derating is experienced in lithium-ion batteries as shown in the following table:

| Battery Temp (° C.) | Permanent Capacity Loss (stored at 40% state-of-charge - recommended storage charge level) | Permanent Capacity Loss (stored at 100% state-of-charge - typical user storage charge level) |
| --- | --- | --- |
| 0 | 2% loss in 1 year; 98% remaining | 6% loss in 1 year; 94% remaining |
| 25 | 4% loss in 1 year; 96% remaining | 20% loss in 1 year; 80% remaining |
| 40 | 15% loss in 1 year; 85% remaining | 35% loss in 1 year; 65% remaining |
| 60 | 25% loss in 1 year; 75% remaining | 40% loss in 3 months |

This table indicates that in a typical user charging environment 4%-15% of the useful life of a lithium-ion battery is lost due to storage at full battery capacity. This effect is accelerated with high charge levels and elevated temperatures. Algorithms within the present invention may improve this derating factor by noting periods of inactivity and purposely reducing the charged battery capacity during these idle times.

Capacity Reduction Charging Voltage (3100)

As generally illustrated in the graph of FIG. 31 (3100), the battery capacity may be reduced based on the charging voltage of the battery. The present invention in some embodiments may keep track of the charge voltage to properly account for optimal battery lifetime during battery charging.

Capacity Reduction Based on Temperature (3200)

Figure 32:
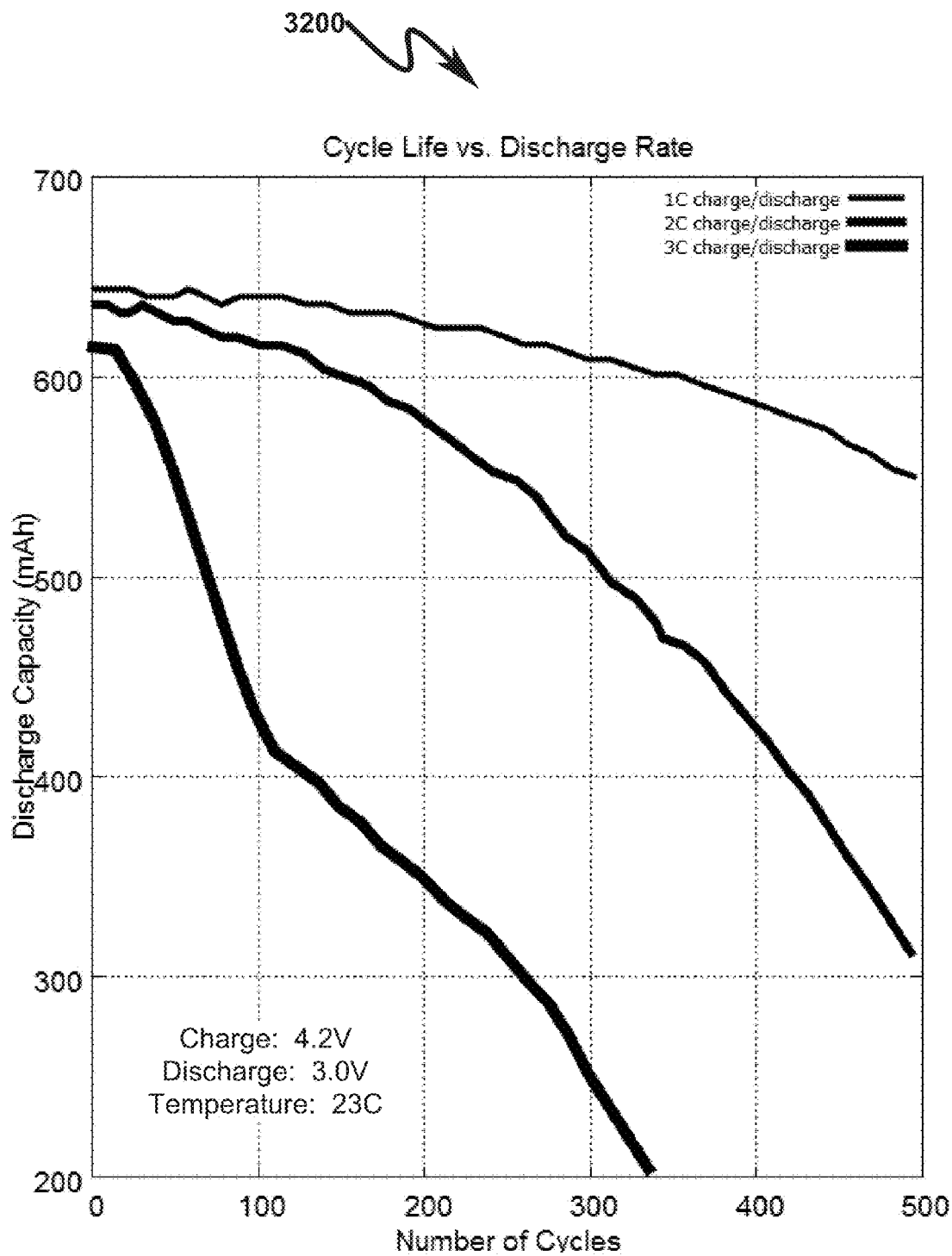
FIG. 32 illustrates an exemplary battery cycle life vs. charge/discharge characteristics.

As generally illustrated in the graph of FIG. 32 (3200), the battery capacity is reduced based on the charge/discharge rates of the battery. The present invention in some embodiments may keep track of the charge/discharge rates to optimize the overall battery capacity over the lifetime of the battery.

Battery Charge Profiles Based on Battery Aging

Battery charging profile (or use profile) describes:
(1) Number of charging and discharging in a given period (30 days);
(2) Durations of each discharging (use of battery) and charging (using wall power); and
(3) Levels of each charging and discharging.

As battery ages, item (1) would increase; item (2) becomes shorter; and item (3) levels will be adjusted, high level becomes higher; low level becomes lower, to give a little more juice to the battery charging cycle.

Preferred Embodiment System Summary

The present invention preferred exemplary system embodiment anticipates a wide variety of variations in the basic theme of construction, but can be generalized as a battery management system comprising:
(a) Power Source Control Unit (PSCU); and
(b) Power Monitor Control Unit (PMCU);
wherein
the PSCU further comprises an electrical power switch that controls electrical current supplied to a wall outlet power adapter responsible for charging a battery supplying power to a computing device;
the PMCU monitors the condition of the battery supplying power to the computing device;
the electrical power switch is controlled by the PMCU via a communication link between the PMCU and the PSCU; and
the PMCU activates the electrical power switch in response to the condition of the battery.

This general system summary may be augmented by the various elements described herein to produce a wide variety of invention embodiments consistent with this overall design description.

Alternate Preferred Embodiment System Summary

The present invention alternate preferred exemplary system embodiment anticipates a wide variety of variations in the basic theme of construction, but can be generalized as a battery management system comprising:
(a) Power Source Control Unit (PSCU); and
(b) Power Monitor Control Unit (PMCU);
wherein
the PSCU further comprises an electrical power switch that controls electrical current supplied from a wall outlet power adapter responsible for charging a battery supplying power to a computing device;
the PMCU monitors the condition of the battery supplying power to the computing device;
the electrical power switch is controlled by the PMCU via a communication link between the PMCU and the PSCU; and
the PMCU activates the electrical power switch in response to the condition of the battery.

This general system summary may be augmented by the various elements described herein to produce a wide variety of invention embodiments consistent with this overall design description.

Multi-Port Alternate Preferred Embodiment System Summary

The present invention may incorporate multiple independent output port PSCU configurations in which multiple regulated outputs from the PSCU are used to service a number of different computing devices. Within this context, the present invention multi-port alternate preferred exemplary system embodiment anticipates a wide variety of variations in the basic theme of construction, but can be generalized as a battery management system comprising:
(a) Power Source Control Unit (PSCU); and
(b) Power Monitor Control Unit (PMCU);
wherein
the PSCU further comprises an electrical power switch that controls electrical current supplied from a wall outlet power adapter responsible for charging a battery supplying power to a computing device;
the electrical current supplied by the regulated power supply is configured by instructions transmitted to the PSCU from the PMCU;
the PMCU monitors the condition of the battery supplying power to the computing device;
the electrical power switch is controlled by the PMCU via a communication link between the PMCU and the PSCU; and
the PMCU activates the electrical power switch in response to the condition of the battery.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a battery management method, the method operating in conjunction with a battery management system comprising:
(a) Power Source Control Unit (PSCU); and
(b) Power Monitor Control Unit (PMCU);
wherein
the PSCU further comprises an electrical power switch that controls electrical current supplied to a wall outlet power adapter responsible for charging a battery supplying power to a computing device;
the PMCU monitors the condition of the battery supplying power to the computing device;
the PMCU communicates with the PSCU to effect the power control by the PSCU;
the PSCU electrical power switch is controlled remotely by the PMCU via a communication link between the PMCU and the PSCU; and the PMCU activates the PSCU electrical power switch in response to the condition of the battery;
wherein the method comprises the steps of:
(1) Determining if the PSCU is available, and if so, proceeding to step (3) (0401);
(2) Issuing a warning message requesting a status of the PSCU and proceeding to step (1) (0402);
(3) Determining if battery charging user input parameters are available, and if not, proceeding to step (7) (0403);
(4) Configuring user battery charge/discharge parameters (0404);
(5) Configuring user battery calibration parameters (0405);
(6) Configuring user battery recondition parameters then proceeding to step (1) (0406);
(7) Executing a battery charge/discharge process (0407);
(8) Executing a battery calibration process (0408); and
(9) Executing a battery reconditioning process then proceeding to step (1) (0409).

One skilled in the art will recognize that these method steps may be augmented or rearranged without limiting the teachings of the present invention. This general method summary may be augmented by the various elements described herein to produce a wide variety of invention embodiments consistent with this overall design description.

Alternate Preferred Embodiment Method Summary

The present invention alternate preferred exemplary method embodiment anticipates a wide variety of variations in the basic theme of implementation, but can be generalized as a battery management method, the method operating in conjunction with a battery management system comprising:
(a) Power Source Control Unit (PSCU); and
(b) Power Monitor Control Unit (PMCU);
wherein
the PSCU further comprises an electrical power switch that controls electrical current supplied from a wall outlet power adapter responsible for charging a battery supplying power to a computing device;
the PMCU monitors the condition of the battery supplying power to the computing device;
the PMCU communicates with the PSCU to effect the power control by the PSCU;
the PSCU electrical power switch is controlled remotely by the PMCU via a communication link between the PMCU and the PSCU; and
the PMCU activates the PSCU electrical power switch in response to the condition of the battery;
wherein the method comprises the steps of:
(1) Determining if the PSCU is available, and if so, proceeding to step (3) (0401);
(2) Issuing a warning message requesting a status of the PSCU and proceeding to step (1) (0402);
(3) Determining if battery charging user input parameters are available, and if not, proceeding to step (7) (0403);
(4) Configuring user battery charge/discharge parameters (0404);
(5) Configuring user battery calibration parameters (0405);
(6) Configuring user battery recondition parameters then proceeding to step (1) (0406);
(7) Executing a battery charge/discharge process (0407);
(8) Executing a battery calibration process (0408); and
(9) Executing a battery reconditioning process then proceeding to step (1) (0409).

One skilled in the art will recognize that these method steps may be augmented or rearranged without limiting the teachings of the present invention. This general method summary may be augmented by the various elements described herein to produce a wide variety of invention embodiments consistent with this overall design description.

Multi-Port Alternate Preferred Embodiment Method Summary

The present invention may incorporate multiple independent output port PSCU configurations in which multiple regulated outputs from the PSCU are used to service a number of different computing devices. Within this context, the present invention multi-port alternate preferred exemplary method embodiment anticipates a wide variety of variations in the basic theme of implementation, but can be generalized as a battery management method, the method operating in conjunction with a battery management system comprising:
(a) Power Source Control Unit (PSCU); and
(b) Power Monitor Control Unit (PMCU);
wherein
the PSCU further comprises an electrical power switch that controls electrical current supplied from a wall outlet power adapter responsible for charging a battery supplying power to a computing device;
the electrical current supplied by the regulated power supply is configured by instructions transmitted to the PSCU from the PMCU;
the PMCU monitors the condition of the battery supplying power to the computing device;
the PMCU communicates with the PSCU to effect the power control by the PSCU;
the PSCU electrical power switch is controlled remotely by the PMCU via a communication link between the PMCU and the PSCU; and
the PMCU activates the PSCU electrical power switch in response to the condition of the battery;
wherein the method comprises the steps of:
(1) Determining if the PSCU is available, and if so, proceeding to step (3) (0401);
(2) Issuing a warning message requesting a status of the PSCU and proceeding to step (1) (0402);
(3) Determining if battery charging user input parameters are available, and if not, proceeding to step (7) (0403);
(4) Configuring user battery charge/discharge parameters (0404);
(5) Configuring user battery calibration parameters (0405);
(6) Configuring user battery recondition parameters then proceeding to step (1) (0406);
(7) Executing a battery charge/discharge process (0407);
(8) Executing a battery calibration process (0408); and
(9) Executing a battery reconditioning process then proceeding to step (1) (0409).

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

- An embodiment wherein the communication link comprises an electrical interface selected from a group consisting of: wireless hardware interface; BLUETOOTH® wireless hardware interface; USB hardware interface; UART hardware interface; serial hardware interface; parallel hardware interface; Ethernet hardware interface; and wireless Ethernet hardware interface.
- An embodiment wherein the computing device is selected from a group consisting of: a laptop computer; a tablet computer; a cellular phone; and a smartphone.
- An embodiment wherein the electrical power switch activation is conditioned on the charge/discharge chemistry profile of the battery.
- An embodiment wherein the electrical power switch activation is conditioned on the charge/discharge history profile of the battery.
- An embodiment wherein the electrical power switch activation is conditioned on the temperature of the battery.
- An embodiment wherein the electrical power switch activation is conditioned on the age of the battery.
- An embodiment wherein the PMCU further comprises the computing device.
- An embodiment wherein the PSCU further comprises multiple switched regulated output power supplies that are individually configured based on instructions from the PMCU to service the battery charging requirements of a number of different computing devices.

One skilled in the art will recognize that other embodiments are possible based on combinations of elements taught within the above invention description.

Generalized Computer Usable Medium

As generally illustrated herein, the system embodiments of the present invention can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A battery management system/method implementing optimal dynamic battery charge/discharge cycling has been disclosed. The system utilizes a power source control unit (PSCU) to selectively switch a power supply source to a battery charger that charges a battery servicing a portable computing device. The PSCU is controlled by a power monitor control unit (PMCU) that monitors the battery state and determines the optimal charge/discharge profile for the battery. Depending on the type and current condition of the battery as well as battery charge/discharge history, the PMCU monitors the historical, current, and/or anticipated demand activity of the battery to determine an optimal charge/discharge profile for the battery to enable maximum battery life under a wide variety of environmental and use profiles. Present invention methods control battery charge/discharge activity based on computing device historical/anticipated use characteristics, battery chemistry, and/or optimal battery lifecycle operation.

What is claimed is:

1. A battery management system comprising:
    (a) Power Source Control Unit (PSCU); and
    (b) Power Monitor Control Unit (PMCU);
    wherein:
    said PSCU further comprises an electrical power switch that controls electrical current supplied to a wall outlet power adapter responsible for charging a battery supplying power to a computing device;
    said PMCU monitors the condition of said battery supplying power to said computing device;
    said electrical power switch is controlled by said PMCU via a wireless communication link between said PMCU and said PSCU;
    said PMCU activates said electrical power switch in response to said condition of said battery;
    said PMCU is configured to accept user input battery charging parameters further comprising parameters defining battery charge/discharge, calibration, and reconditioning;
    said PMCU is configured to communicate with said PSCU to determine if said PSCU is available; and
    said PMCU is configured to communicate with said PSCU to execute battery charge/discharge, battery calibration, and battery reconditioning processes controlled in accordance with said user input battery charging parameters if said PMCU determines that said PSCU is available.

2. The battery management system of claim 1 wherein said wireless communication link comprises an electrical interface selected from a group consisting of: wireless hardware interface; BLUETOOTH® wireless hardware interface; WiFi; ISM; ZIGBEE®; and wireless Ethernet hardware interface.

3. The battery management system of claim 1 wherein said computing device is selected from a group consisting of: a laptop computer; a tablet computer; a cellular phone; and a smartphone.

4. The battery management system of claim 1 wherein said electrical power switch activation is conditioned on the charge/discharge chemistry profile of said battery.

5. The battery management system of claim 1 wherein said electrical power switch activation is conditioned on the charge/discharge history profile of said battery.

6. The battery management system of claim 1 wherein said electrical power switch activation is conditioned on the temperature of said battery.

7. The battery management system of claim 1 wherein said electrical power switch activation is conditioned on the age of said battery.

8. The battery management system of claim 1 wherein said PMCU further comprises said computing device.

9. A tangible non-transitory computer usable medium having computer-readable program code means embodied thereon comprising a battery management method, said method operating in conjunction with a battery management system, said system comprising:
(a) Power Source Control Unit (PSCU); and
(b) Power Monitor Control Unit (PMCU);
wherein:
said PSCU further comprises an electrical power switch that controls electrical current supplied to a wall outlet power adapter responsible for charging a battery supplying power to a computing device;
said PMCU monitors the condition of said battery supplying power to said computing device;
said electrical power switch is controlled by said PMCU via a wireless communication link between said PMCU and said PSCU; and
said PMCU activates said electrical power switch in response to said condition of said battery;
wherein said method comprises the steps of:
(1) Determining if said PSCU is available, and if so, proceeding to step (3);
(2) Issuing a warning message requesting a status of said PSCU and proceeding to said step (1);
(3) Determining if battery charging user input parameters are available, and if not, proceeding to step (7);
(4) Configuring user battery charge/discharge parameters;
(5) Configuring user battery calibration parameters;
(6) Configuring user battery recondition parameters then proceeding to said step (1);
(7) Executing a battery charge/discharge process;
(8) Executing a battery calibration process; and
(9) Executing a battery reconditioning process then proceeding to said step (1).

10. The computer readable medium of claim 9 wherein said wireless communication link comprises an electrical interface selected from a group consisting of: wireless hardware interface; BLUETOOTH® wireless hardware interface; WiFi; ISM; ZIGBEE®; and wireless Ethernet hardware interface.

11. The computer readable medium of claim 9 wherein said computing device is selected from a group consisting of: a laptop computer; a tablet computer; a cellular phone; and a smartphone.

12. The computer readable medium of claim 9 wherein said electrical power switch activation is conditioned on the charge/discharge chemistry profile of said battery.

13. The computer readable medium of claim 9 wherein said electrical power switch activation is conditioned on the charge/discharge history profile of said battery.

14. The computer readable medium of claim 9 wherein said electrical power switch activation is conditioned on the temperature of said battery.

15. The computer readable medium of claim 9 wherein said electrical power switch activation is conditioned on the age of said battery.

16. The computer readable medium of claim 9 wherein said PMCU further comprises said computing device.

17. A battery management system comprising:
(a) Power Source Control Unit (PSCU); and
(b) Power Monitor Control Unit (PMCU);
wherein:
said PSCU further comprises an electrical power switch that controls electrical current supplied from a wall outlet power adapter responsible for charging a battery supplying power to a computing device;
said PMCU monitors the condition of said battery supplying power to said computing device;
said electrical power switch is controlled by said PMCU via a wireless communication link between said PMCU and said PSCU;
said PMCU activates said electrical power switch in response to said condition of said battery;
said PMCU is configured to accept user input battery charging parameters further comprising parameters defining battery charge/discharge, calibration, and reconditioning;
said PMCU is configured to communicate with said PSCU to determine if said PSCU is available; and
said PMCU is configured to communicate with said PSCU to execute battery charge/discharge, battery calibration, and battery reconditioning processes controlled in accordance with said user input battery charging parameters if said PMCU determines that said PSCU is available.

18. The battery management system of claim 17 wherein said wireless communication link comprises an electrical interface selected from a group consisting of: wireless hardware interface; BLUETOOTH® wireless hardware interface; WiFi; ISM; ZIGBEE®; and wireless Ethernet hardware interface.

19. The battery management system of claim 17 wherein said computing device is selected from a group consisting of: a laptop computer; a tablet computer; a cellular phone; and a smartphone.

20. The battery management system of claim 17 wherein said electrical power switch activation is conditioned on the charge/discharge chemistry profile of said battery.

21. The battery management system of claim 17 wherein said electrical power switch activation is conditioned on the charge/discharge history profile of said battery.

22. The battery management system of claim 17 wherein said electrical power switch activation is conditioned on the temperature of said battery.

23. The battery management system of claim 17 wherein said electrical power switch activation is conditioned on the age of said battery.

24. A tangible non-transitory computer usable medium having computer-readable program code means embodied thereon comprising a battery management method, said method operating in conjunction with a battery management system, said system comprising:
(a) Power Source Control Unit (PSCU); and
(b) Power Monitor Control Unit (PMCU);
wherein:
said PSCU further comprises an electrical power switch that controls electrical current supplied from a wall outlet power adapter responsible for charging a battery supplying power to a computing device;
said PMCU monitors the condition of said battery supplying power to said computing device;
said electrical power switch is controlled by said PMCU via a wireless communication link between said PMCU and said PSCU; and
said PMCU activates said electrical power switch in response to said condition of said battery;
wherein said method comprises the steps of:
(1) Determining if said PSCU is available, and if so, proceeding to step (3);
(2) issuing a warning message requesting a status of said PSCU and proceeding to said step (1);
(3) Determining if battery charging user input parameters are available, and if not, proceeding to step (7);
(4) Configuring user battery charge/discharge parameters;
(5) Configuring user battery calibration parameters;
(6) Configuring user battery recondition parameters then proceeding to said step (1);
(7) Executing a battery charge/discharge process;
(8) Executing a battery calibration process; and
(9) Executing a battery reconditioning process then proceeding to said step (1).

25. The computer readable medium of claim 24 wherein said wireless communication link comprises an electrical interface selected from a group consisting of: wireless hardware interface; BLUETOOTH® wireless hardware interface; WiFi; ISM; ZIGBEE®; and wireless Ethernet hardware interface.

26. The computer readable medium of claim 24 wherein said computing device is selected from a group consisting of: a laptop computer; a tablet computer; a cellular phone; and a smartphone.

27. The computer readable medium of claim 24 wherein said electrical power switch activation is conditioned on the charge/discharge chemistry profile of said battery.

28. The computer readable medium of claim 24 wherein said electrical power switch activation is conditioned on the charge/discharge history profile of said battery.

29. The computer readable medium of claim 24 wherein said electrical power switch activation is conditioned on the temperature of said battery.

30. The computer readable medium of claim 24 wherein said electrical power switch activation is conditioned on the age of said battery.

* * * * *